US011907971B2

(12) United States Patent
Ritzer et al.

(10) Patent No.: US 11,907,971 B2
(45) Date of Patent: Feb. 20, 2024

(54) SYSTEMS, METHODS, AND STORAGE MEDIA FOR A SOCIAL COMMERCE PLATFORM

(71) Applicant: Nigh Technologies, Inc., Boulder, CO (US)

(72) Inventors: Joshua Ritzer, Boulder, CO (US); Robert P. Conroy, Boulder, CO (US); Andrew Obler, Louisville, CO (US); Christian Dokken, Boulder, CO (US)

(73) Assignee: Joshua Ritzer, Boulder, CO (US)

( * ) Notice: Subject to any disclaimer, the term of this patent is extended or adjusted under 35 U.S.C. 154(b) by 0 days.

(21) Appl. No.: 18/110,600

(22) Filed: Feb. 16, 2023

(65) Prior Publication Data

US 2023/0267504 A1    Aug. 24, 2023

Related U.S. Application Data

(60) Provisional application No. 63/312,886, filed on Feb. 23, 2022.

(51) Int. Cl.
*G06Q 30/0251* (2023.01)
*G06Q 10/02* (2012.01)

(52) U.S. Cl.
CPC ......... *G06Q 30/0261* (2013.01); *G06Q 10/02* (2013.01); *G06Q 30/0252* (2013.01)

(58) Field of Classification Search
CPC . G06Q 30/0261; G06Q 10/02; G06Q 30/0252
See application file for complete search history.

(56) References Cited

U.S. PATENT DOCUMENTS 6,434,533 B1   8/2002   Fitzgerald
6,782,370 B1   8/2004   Stack
(Continued)

FOREIGN PATENT DOCUMENTS

WO     02/25553 A2      3/2002
WO    2006/074243 A2    7/2006
WO    2010/068551 A1    6/2010

OTHER PUBLICATIONS

"An Economically Viable Solution to Geofencing for Mass-Market Applications" Amie Greenwald, Georg Hampel, Chitra Phadke, and Viswanath Poosala 2011 (Year: 2011).*

(Continued)

*Primary Examiner* — Alexandru Cirnu
(74) *Attorney, Agent, or Firm* — Neugeboren O'Dowd PC

(57) ABSTRACT

A system for engaging customers is disclosed, where the system is configured to receive information related to a plurality of offers provided by a plurality of entities, the information comprising one or more of location rules, time rules, and offer details; receive geolocation information from a user device; identify, from the plurality of offers, at least one offer, wherein the identifying is based at least in part on the geolocation information and the information related to the plurality of offers; obtain one or more first information comprising information related to one of the at least one offer; display the one or more first information, wherein the one or more first information further comprises information provided by at least one entity; select a first offer, wherein the selecting comprises sending a request for viewing, booking, and/or purchasing the first offer; and receiving an acceptance for the first offer.

21 Claims, 10 Drawing Sheets

(56) References Cited

U.S. PATENT DOCUMENTS

| | | |
|---|---|---|
| 7,263,505 B1 | 8/2007 | Forlai |
| 7,596,513 B2 | 9/2009 | Fargo |
| 7,599,858 B1 | 10/2009 | Grady et al. |
| 7,974,873 B2 | 7/2011 | Simmons et al. |
| 8,005,747 B2 | 8/2011 | Forlai |
| 8,138,930 B1 | 3/2012 | Heath |
| 8,140,403 B2 | 3/2012 | Ramalingam et al. |
| 8,364,522 B1 | 1/2013 | Gevelber |
| 8,478,630 B2 | 7/2013 | Reichman |
| 8,484,064 B2 | 7/2013 | Reichman et al. |
| 8,515,855 B2 | 8/2013 | Forlai |
| 8,543,470 B2 | 9/2013 | Grady et al. |
| 8,660,951 B2 | 2/2014 | Calman et al. |
| 8,738,462 B2 | 5/2014 | Mesaros |
| 2002/0065713 A1 | 5/2002 | Awada et al. |
| 2004/0073482 A1 | 4/2004 | Wiggins et al. |
| 2004/0199412 A1 | 10/2004 | Mccauley |
| 2004/0215517 A1 | 10/2004 | Chen et al. |
| 2006/0200305 A1 | 9/2006 | Sheha et al. |
| 2006/0212355 A1 | 9/2006 | Teague et al. |
| 2007/0066397 A1* | 3/2007 | Nammi .............. G06Q 10/02 463/42 |
| 2007/0075136 A1 | 4/2007 | Jacob |
| 2007/0124216 A1 | 5/2007 | Lucas |
| 2010/0250351 A1 | 9/2010 | Gillenson et al. |
| 2010/0262449 A1* | 10/2010 | Monteforte .......... H04W 4/029 705/14.66 |
| 2011/0196725 A1 | 8/2011 | Malcolmson et al. |
| 2012/0004943 A1 | 1/2012 | Reichman |
| 2012/0047011 A1* | 2/2012 | Rippetoe ............ G06Q 30/0261 705/14.58 |
| 2012/0109751 A1 | 5/2012 | Binenstock et al. |
| 2012/0215610 A1 | 8/2012 | Amaro et al. |
| 2012/0215635 A1 | 8/2012 | Ramer et al. |
| 2012/0221402 A1 | 8/2012 | Brown et al. |
| 2012/0259696 A1 | 10/2012 | Monteverde |
| 2013/0031001 A1 | 1/2013 | Frechette et al. |
| 2013/0159071 A1 | 6/2013 | Inks |
| 2013/0191195 A1 | 7/2013 | Carlson et al. |
| 2013/0275198 A1* | 10/2013 | Zeto, III ............ G06Q 30/0225 705/14.26 |
| 2014/0274022 A1 | 9/2014 | Bell et al. |
| 2015/0088652 A1* | 3/2015 | Finley ................ G06Q 30/0261 705/14.58 |
| 2015/0278864 A1* | 10/2015 | McDevitt ........... G06Q 30/0261 705/14.58 |
| 2017/0161784 A1* | 6/2017 | Malik ................ G06Q 30/0267 |
| 2017/0228785 A1* | 8/2017 | Evje ................ G06Q 30/0275 |
| 2018/0032997 A1 | 2/2018 | Gordon et al. |
| 2018/0293617 A1 | 10/2018 | Pittman |
| 2019/0034966 A1* | 1/2019 | Zaheer ............... G06Q 30/0261 |

OTHER PUBLICATIONS

Rodriquez, Kari, "International Search Report and Written Opinion in International Patent Application No. PCT/2023/013208," dated May 26, 2023, 9 Pages.

\* cited by examiner

Legend
— ·· — Zone(s) 401

SYSTEMS, METHODS, AND STORAGE MEDIA FOR A SOCIAL COMMERCE PLATFORM

CROSS-REFERENCE TO RELATED APPLICATIONS

The present application for patent claims priority to U.S. Provisional Application No. 63/312,886 entitled "Systems, Methods, and Storage Media for a Social Commerce Platform," filed Feb. 23, 2022, and assigned to the assignee hereof and hereby expressly incorporated by reference herein.

FIELD OF THE DISCLOSURE

The present disclosure relates generally to a social commerce platform. In particular, but not by way of limitation, the present disclosure relates to systems, methods and storage media for a local social commerce platform.

DESCRIPTION OF RELATED ART

Businesses, such as business-to-consumer (B2C) businesses, often have capacity to accommodate extra customers. In some cases, this may simply be due to customers canceling their booking/appointment, e.g., on the day of, or a couple hours ahead of their appointment. In other cases, a venue (e.g., a sporting venue, a concert venue) may have unsold tickets that are available for purchase before the start of the event. Alternatively, a business may have "slow" and "busy" time periods, for instance, restaurants may be relatively busy during lunch and/or dinner hours but slow in the hours in between. Similarly, customers may also need a last-minute appointment/booking, for instance, for a haircut, a car wash, a dinner reservation, etc.

The discussion in the description of related art section should not be assumed to be prior art merely because it is associated with this section. The description of related art section may include one or more aspects of the subject technology.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In light of the problems identified above, there is a need for a commerce platform that allows businesses with expiring available capacity to engage with customers seeking a reservation/appointment in a shortened time-frame, which may not only serve to drive business revenue, but also enhance customer experience. Some embodiments of the disclosure may be characterized as a social local commerce platform ("commerce platform") that facilitates in making local commerce more efficient by allowing local business or entities with last-minute availability to reach customers nearby (e.g., within a predefined radius from a location/venue where an entity is hosting an event or providing one or more offers; a location/venue where an entity is hosting an event or providing one or more offers, to name two non-limiting examples), for instance, before the event/offer starts, event/offer expires, reservation or appointment timeslots are filled up, slow period for the entity or business ends, etc. Generally speaking, aspects of the present disclosure may be employed by any business or entity looking to drive sales, customer engagement, enhance customer experience, gain new customers, and/or promote products/events/offers, to name a few. Business or entities may utilize the disclosed commerce platform to display events/offers with expiring availability to one or more customers that have a likelihood of being able to avail said events/offers, for instance, before a pre-defined cut-off time (e.g., an event/offer start time, an event/offer expiration time).

In some examples, the commerce platform may comprise (or may be implemented using) a computing platform. The commerce platform may comprise one or more hardware processors configured by machine-readable instructions to effectuate one or more aspects of the present disclosure. In some cases, the commerce platform is embodied in hardware, software, or a combination thereof. Furthermore, the commerce platform (also referred to as system) may include one or more servers, computing platforms or user equipment(s) (UEs), databases, transceivers (i.e., transmitters and/or receivers), amongst other components for performing the operations of one or more embodiments of the present disclosure.

In some implementations, the server of the commerce platform (e.g., system 600 in FIG. 6) may communicate with one or more client computing platforms (also referred to as UEs, such as UEs 110, 210, 610 in FIGS. 1, 2, and/or 6) according to a client/server architecture and/or other architectures. UEs may be configured to communicate with other UEs or client computing platforms via the server (e.g., server 605, server 705 in FIGS. 6 and 7) and/or according to a peer-to-peer architecture and/or other architectures. Users (e.g., customers, event managers, business owners) may access the system via the UEs. It should be noted that, as used herein, the term "user" may apply to both customers/consumers, as well as event managers (e.g., business owners). In other words, the term "user" may refer to any person or entity who can interact with the system of the present disclosure, e.g., via a user device or UE.

In some embodiments, server(s) may be configured by machine-readable instructions, where the machine-readable instructions may include one or more instruction modules. The instruction modules may include computer program modules. In some implementations, server(s), client computing platform(s) or UEs, and/or external resources (e.g., a third-party geolocation system, such as a Global Positioning System or GPS) may be operatively linked via one or more wired or wireless communication links. For example, such communication links may be established, at least in part, via a network (e.g., network 630 in FIG. 6) such as the Internet and/or other networks. It will be appreciated that this is not intended to be limiting, and that the scope of this disclosure includes implementations in which server(s), client computing platform(s) or UEs, and/or external resources may be operatively linked via some other communication media.

A given UE (or client computing platform) may include one or more processors configured to execute computer program modules. The computer program modules may be configured to enable an expert or user associated with the given UE to interface with the commerce platform and/or external resources, and/or provide other functionality attributed herein to UEs. By way of non-limiting example, the given UE (e.g., UE 110, UE 210, UE 610) may include one or more of a desktop computer, a laptop computer, a handheld computer, a tablet computing platform, a NetBook, a Smartphone, and/or any other applicable computing platforms. In some examples, external resources may include sources of information (e.g., GPS or geolocation) outside of system (e.g., system 600), external entities participating with the commerce platform or system, and/or other resources. In some implementations, some or all of the functionality attributed herein to external resources may be provided by resources included in the system of the present disclosure.

In some examples, the server(s) may include electronic storage, one or more processors, and/or other components. The server(s) may include communication lines, or ports to enable the exchange of information with a network and/or other computing platforms. Illustration of the server(s), such as servers 605, 705, etc., is not intended to be limiting. The server(s) may include a plurality of hardware, software, and/or firmware components operating together to provide the functionality attributed herein to the server(s). In one non-limiting example, a server may be implemented by a cloud of computing platforms operating together as the server.

Electronic storage may comprise non-transitory storage media that electronically stores information. The electronic storage media of electronic storage may include one or both of system storage that is provided integrally (i.e., substantially non-removable) with the server(s) and/or removable storage that is removably connectable to server(s) via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network or VPN, and/or other virtual storage resources). Electronic storage may store software algorithms, information determined by processor(s), information received from server(s), information received from UEs or client computing platform(s), and/or other information that enables the server(s) to function as described herein.

Processor(s) may be configured to provide information processing capabilities in server(s). As such, processor(s) may include one or more of a digital processor, an analog processor, a digital circuit designed to process information, an analog circuit designed to process information, a state machine, and/or other mechanisms for electronically processing information. In some implementations, processor(s) may include one or more processing units. These processing units may be physically located within the same device, or processor(s) may represent processing functionality of a plurality of devices operating in coordination. Processor(s) may be configured to execute the one or more instruction modules or computer program modules (e.g., event module 715 in FIG. 7; zone module 730, location module 735, purchase module 740 in FIG. 7) of the system/platform. Processor(s) may also be configured to execute one or more other modules by software; hardware; firmware; some combination of software, hardware, and/or firmware; and/or other mechanisms for configuring processing capabilities on the processor(s). As used herein, the term "module" may refer to any component or set of components that perform the functionality attributed to the module. This may include one or more physical processors during execution of processor readable instructions, the processor readable instructions, circuitry, hardware, storage media, or any other components.

In some aspects, the techniques described herein relate to a system configured for engaging customers using a computer platform, the system including: one or more hardware processors configured by machine-readable instructions to: receive information related to a plurality of offers provided by a plurality of entities, wherein the information for each of the plurality of offers includes one or more of location rules, time rules, and offer details; receive geolocation information from a user device; identify, from the plurality of offers, at least one offer, wherein the identifying is based at least in part on the geolocation information and the information related to each of the plurality of offers; obtain, from the information related to the plurality of offers, one or more first information, wherein each of the one or more first information includes information related to one of the at least one offer; display, on the user device, the one or more first information, wherein the one or more first information further includes information provided by at least one entity of the plurality of entities; select, from the user device, a first offer of the at least one offer, wherein the selecting includes sending a request for at least one of viewing, booking, and purchasing the first offer; and receive, at the user device, an acceptance for the at least one of viewing, booking, and purchasing the first offer.

In some aspects, the techniques described herein relate to a system, wherein the time rules for each of the plurality of offers includes one or more of a start time, an end time, one or more cut-off times, and a time range.

In some aspects, the techniques described herein relate to a system, wherein the offer details for each of the plurality of offers includes one or more of: pricing information, promotional information, wherein the promotional information includes one or more of media, a digital advertisement, and a notice or announcement, and information related to one or more of age requirements and group size requirements.

In some aspects, the techniques described herein relate to a system, wherein the media includes one or more of non-fungible tokens, digital images or photographs, real-time audio streaming data, real-time video streaming data, an audio recording, and a video recording.

In some aspects, the techniques described herein relate to a system, wherein the information for each of the plurality of offers further includes a location and geofencing information for at least one of the plurality of offers, wherein the geofencing information defines one or more zones surrounding the location.

In some aspects, the techniques described herein relate to a system, wherein the location rules for each of the plurality of offers are defined in relation to the location and the geofencing information for the at least one of the plurality of offers.

In some aspects, the techniques described herein relate to a system, wherein the time rules for each of the plurality of offers includes: a first time rule for a first zone, wherein the first time rule includes one of a first time range and a first cut-off time; a second time rule for a second zone, wherein the second time rule includes one of a second time range and a second cut-off time; and wherein one or more of: the first zone is larger than the second zone, the second zone is surrounded by the first zone, the first time range starts and ends before the second time range, and the second cut-off time is later than the first cut-off time.

In some aspects, the techniques described herein relate to a system, wherein the identifying the at least one offer from the plurality of offers is further based on: determining a timestamp associated with the geolocation information received from the user device; and evaluating, for each of the plurality of offers, whether the timestamp and the geolocation information pass the time rules and location rules.

In some aspects, the techniques described herein relate to a system, wherein: the location rules include information related to a plurality of zones or geofenced areas; and the time rules include information related to a plurality of cut-off times, or one cut-off time for each of the plurality of zones or geofenced areas.

In some aspects, the techniques described herein relate to a system, wherein evaluating, for each of the plurality of offers, whether the timestamp and the geolocation information pass the time rules and location rules includes: determining whether a user location corresponding to the geolocation information is within at least one of the plurality of zones or geofenced areas; and determining whether the timestamp associated with the geolocation information is before a respective cut-off time for the at least one zone or geofenced area.

In some aspects, the techniques described herein relate to a system, wherein the timestamp and the geolocation information associated with the one or more first information pass the time rules and location rules for the one of the at least one offer associated with the one or more first information displayed on the user device.

In some aspects, the techniques described herein relate to a system, wherein the location rules include information related to a plurality of zones, including at least a first buy zone and a first view zone, and wherein: a geofenced area corresponding to the first buy zone is smaller than a geofenced area corresponding to the first view zone; or the geofenced area corresponding to the first buy zone is larger than the geofenced area corresponding to the first view zone.

In some aspects, the techniques described herein relate to a system, wherein the identifying the at least one offer is further based at least in part on one or more of velocity information for the user device, weather information, and traffic information.

In some aspects, the techniques described herein relate to a method for engaging customers using a computer platform, the method including: receiving information related to a plurality of offers provided by a plurality of entities, wherein the information for each of the plurality of offers includes one or more of location rules, time rules, and offer details; receiving geolocation information from a user device; identifying, from the plurality of offers, at least one offer, wherein the identifying is based at least in part on the geolocation information and the information related to each of the plurality of offers; obtaining, from the information related to a plurality of offers, one or more first information, wherein each of the one or more first information includes information related to one of the at least one offer; displaying, on the user device, the one or more first information, wherein the one or more first information further includes information provided by at least one entity of the plurality of entities; selecting, from the user device, a first offer of the at least one offer, wherein the selecting includes sending a request for at least one of viewing, booking, and purchasing the first offer; and receiving, at the user device, an acceptance for the at least one of viewing, booking, and purchasing the first offer.

In some aspects, the techniques described herein relate to a method, wherein the time rules for each of the plurality of offers includes one or more of a start time, an end time, one or more cut-off times, and a time range.

In some aspects, the techniques described herein relate to a method, wherein the information for each of the plurality of offers further includes: a location and geofencing information for at least one of the plurality of offers, wherein the geofencing information defines one or more zones surrounding the location; and wherein the location rules for each of the plurality of offers are defined in relation to the location and the geofencing information for the at least one of the plurality of offers.

In some aspects, the techniques described herein relate to a method, wherein the time rules for each of the plurality of offers includes: a first time rule for a first zone, wherein the first time rule includes one of a first time range and a first cut-off time; a second time rule for a second zone, wherein the second time rule includes one of a second time range and a second cut-off time; and wherein one or more of: the first zone is larger than the second zone, the second zone is surrounded by the first zone, the first time range starts and ends before the second time range, and the second cut-off time is later than the first cut-off time.

In some aspects, the techniques described herein relate to a method, wherein the identifying the at least one offer from the plurality of offers is further based on: determining a timestamp associated with the geolocation information received from the user device; and evaluating, for each of the plurality of offers, whether the timestamp and the geolocation information pass the time rules and location rules; wherein the location rules include information related to a plurality of zones or geofenced areas; and wherein the time rules include information related to a plurality of cut-off times, or one cut-off time for each of the plurality of zones or geofenced areas.

In some aspects, the techniques described herein relate to a method, wherein evaluating, for each of the plurality of offers, whether the timestamp and the geolocation information pass the time rules and location rules includes: determining whether a user location corresponding to the geolocation information is within at least one of the plurality of zones or geofenced areas; and determining whether the timestamp associated with the geolocation information is before a respective cut-off time for the at least one zone or geofenced area.

In some aspects, the techniques described herein relate to a non-transient computer-readable storage medium having instructions embodied thereon, the instructions being executable by one or more processors to perform a method for engaging customers using a computer platform, the method including: receiving information related to a plurality of offers provided by a plurality of entities, wherein the information for each of the plurality of offers includes one or more of location rules, time rules, and offer details; receiving geolocation information from a user device; identifying, from the plurality of offers, at least one offer, wherein the identifying is based at least in part on the geolocation information and the information related to each of the plurality of offers; obtaining, from the information related to a plurality of offers, one or more first information, wherein each of the one or more first information includes information related to one of the at least one offer; displaying, on the user device, the one or more first information, wherein the one or more first information further includes information provided by at least one entity of the plurality of entities; selecting, from the user device, a first offer of the at least one offer, wherein the selecting includes sending a request for at least one of viewing, booking, and purchasing the first offer; and receiving, at the user device, an acceptance for the at least one of viewing, booking, and purchasing the first offer.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
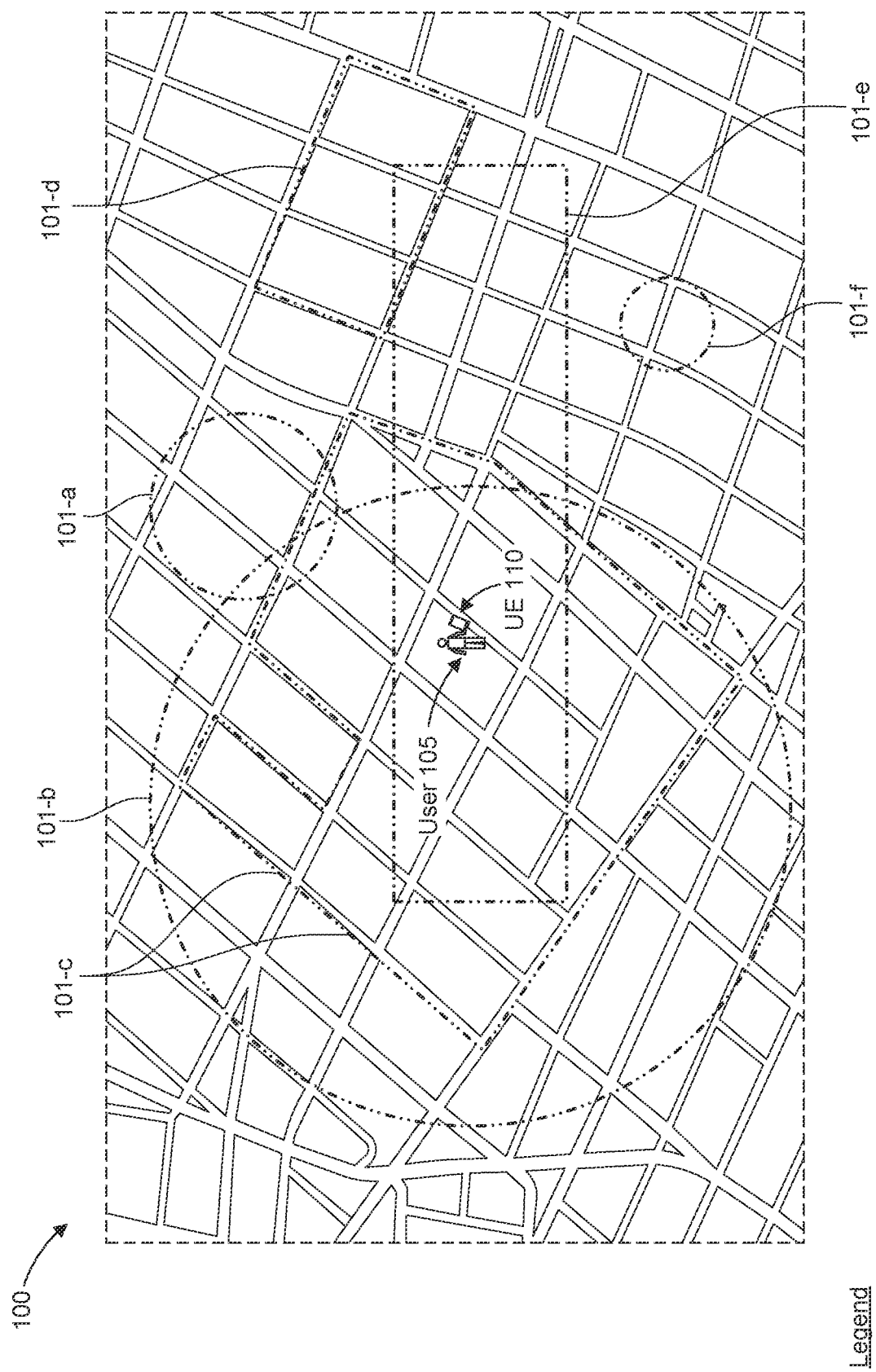
FIG. 1 depicts a plurality of zones overlayed on a geographic map, in accordance with various aspects of the present disclosure.

The present disclosure relates generally to a local social commerce platform (or simply, commerce platform). More specifically, but without limitation, the present disclosure relates to systems, methods and storage media for a commerce platform.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The embodiments described below are not intended to limit the disclosure to the precise form disclosed, nor are they intended to be exhaustive. Rather, the embodiment(s) are presented to provide a description so that others skilled in the art may utilize their teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art. Some non-limiting examples of such a computer may include the server 605, computer system 700, and/or computer system 800 described below in relation to FIGS. 6, 7, and/or 8, respectively.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are sometimes described in terms, such as comparing, sorting, selecting, or adding, which are commonly associated with mental operations performed by a human operator. It should be understood that these terms are employed to provide a clear description of an embodiment of the present disclosure, and no such human operator is necessary.

This requirement for machine implementation for the practical application of the algorithms is understood by those persons of skill in this art as not a duplication of human thought, rather as significantly more than such human capability. Useful machines for performing the operations of one or more embodiments of the present disclosure include general purpose digital computers or other similar devices. In all cases, the distinction between the method operations in operating a computer and the method of computation itself should be recognized. One or more embodiments of the present disclosure relate to methods and apparatus for operating a computer in processing electrical or other (e.g., mechanical, chemical) physical signals to generate other desired physical manifestations or signals. The computer operates on software modules (i.e., instruction modules), which are collections of signals stored on a media (e.g., non-transitory computer readable storage media) that represents a series of machine instructions that enable the computer processor to perform the machine instructions that implement the algorithmic steps. Such machine instructions may be the actual computer code the processor interprets to implement the instructions, or alternatively may be a higher-level coding of the instructions that is interpreted to obtain the actual computer code. The software module may also include a hardware component, wherein some aspects of the algorithm are performed by the circuitry itself rather than a result of an instruction.

Some embodiments of the present disclosure rely on an apparatus for performing one or more of the disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context.

In the description of embodiments herein, frequent use is made of the terms "server", "client", and "client/server architecture". In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that client and server each perform distinct, but complementary functions to accomplish a task or provide a service. The client and server accomplish this by exchanging data, messages, and often state information using a computer network, or multiple networks. It should be appreciated that in a client/server architecture for distributed computing, there are typically multiple servers and multiple clients, and they do not map to each other and further there may be more servers than clients or more clients than servers. A server (e.g., server 605 in FIG. 6) is typically designed to interact with multiple clients (e.g., UEs 610, each associated with one of a user 605 or an event manager 615).

In networks, bi-directional data communication (i.e., data or network traffic) typically occurs through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

FIG. 1 illustrates a geographic map 100 showing a plurality of zones 101 (also referred to as geofenced areas 101) overlayed on said map 100, in accordance with various aspects of the present disclosure. FIG. 1 also shows a user 105 associated with a user equipment (UE) 110. The UE 110 may include geolocation capabilities, such as a GPS chip, which allows the location of the UE 110 and/or user 105 to be tracked in real-time or substantially real-time.

In this example, the map 100 includes the plurality of zones 101, such as zones 101-*a*, 101-*b*, 101-*c*, 101-*d*, 101-*e*, and/or 101-*f*, where each zone 101 corresponds to a certain geofenced area (e.g., one or more blocks on a street, an area or region bounded by a plurality of streets or street intersections, an area or region within a predefined radius from a central point or location, to name a few non-limiting examples). For example, each of zones 101-*a*, 101-*b*, and 101-*f* comprises a circular geofenced area. Additionally, each of zones 101-*d* and 101-*e* comprises a rectangular geofenced area. Zone 101-*c* comprises a polygonal geofenced area that is defined by a plurality of streets and street intersections. It is contemplated that a zone 101 may comprise any size of any shape—polygonal, circular, rectangular, trapezoidal, or other shape and multiple sized/shapes may be used to define a zone. In some cases, each of the zones 101 may be associated with at least one offer/event provided by at least one entity, further described below in relation to FIGS. 2-5.

Figure 2:
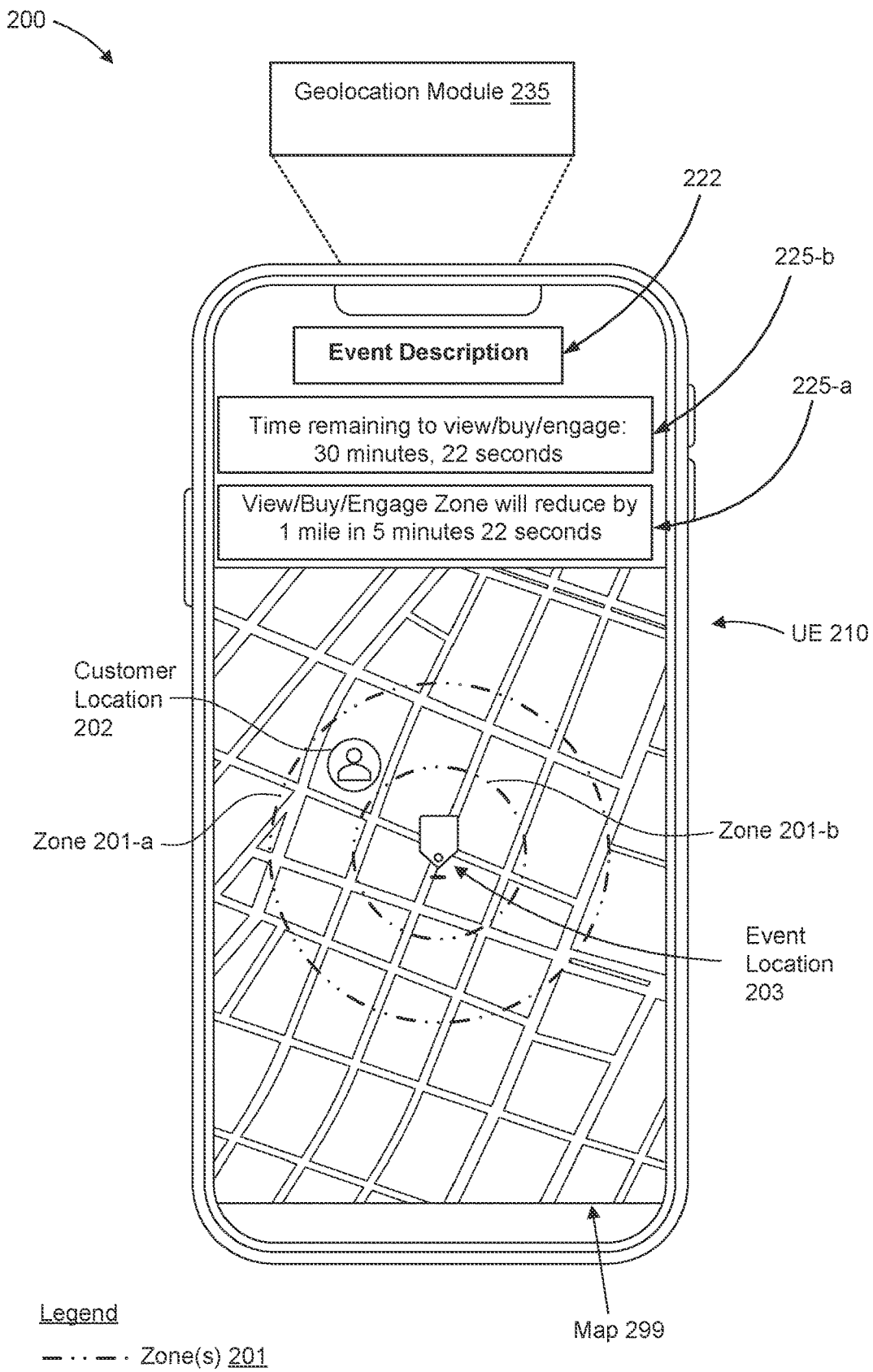
FIG. 2 illustrates an example of a user interface (UI) displayed on a user equipment (UE), in accordance with various aspects of the present disclosure.

In some cases, two or more zones 101 may intersect, overlap, be adjacent to each other, or a combination thereof. For example, zone 101-*a* overlaps with zones 101-*b* and 101-*c*, and zone 101-*e* overlaps with zones 101-*b*, 101-*c*, and 101-*d*. Furthermore, zone 101-*f* does not overlap with any of zones 101-*a* through 101-*e*. In other cases, a zone having a smaller geofenced area may be entirely within another zone having a larger geofenced area, as shown in FIGS. 2 and/or 4. In this example, the user 105 associated with UE 110 is located within one or more of the zones 101, such as zone 101-*b*, zone 101-*c*, and zone 101-*e*. According to aspects of the disclosure, entities or businesses (e.g., event or sporting venues, restaurants, barbers, golf courses, venues hosting activities and classes, festivals or fairs, amusement parks, theaters, museums, and/or other entertainment venues looking to drive sales and/or engage additional customers in a shortened time-span, etc.) may utilize a commerce platform/system, such as system 900 in FIG. 9, to reach out to potential customers, such as user 105, if/when the business has expiring available capacity, in order to not only facilitate in higher sales/profits for the business, but also enable customers to avail of potentially last-minute offers/services. In some aspects, the commerce platform/system may help streamline local commerce by linking businesses with available capacity (e.g., available booking or reservation time-slots; extra tickets for a sporting or entertainment event; unsold slots for a class or activity; available tables during off-peak hours, at or near closing or opening time, to name a few non-limiting examples) with interested customers in the vicinity of the event/offer. By informing customers and/or the local businesses of expiring offers, the commerce platform may create an urgency for the customers and the local businesses to view/access/purchase and display/promote these offers, respectively. Such a system may therefore provide local businesses with a more optimal way to reach nearby customers (e.g., users or customers within a zone, such as user 105 in zones 101-*b*, 101-*c*, and/or 101-*e*). This in turn can help create a more efficient local commerce marketplace (e.g., by utilizing insights into market supply and demand). In some cases, the disclosed commerce platform/system, such as system 900 in FIG. 9, may also assist customers in locating local events/offers available near them (e.g., within the same zone 101 as the user 105).

In some examples, each of the zones 101 may be predefined by a business, or alternatively, suggested by the commerce platform. For instance, zone 101-*a* may be associated with a first business, zone 101-*b* with a second business, and so on. In some cases, the business may specify a plurality of rules, such as, but not limited to, location rules, time rules, and/or other rules (e.g., a minimum age requirement for the user, such as at least 18 years old or at least 21 years old; group size requirement, such as anywhere between 2-4 users or anywhere between 5-10 users). Alternatively, one or more of the rules may be defined by the commerce platform (e.g., server 605 in FIG. 6, system 900 in FIG. 9), for instance, based on analyzing rules specified by other business or entities. In some cases, the commerce platform helps enforce one or more of the plurality of rules associated with the event/offer. As an example, a location rule may specify that the user 105 needs to be within the zone 101-*d* to view offers/events specific to that zone. In this case, the commerce platform may not display the offers/events specific to zone 101-*d*. In another case, a location rule may specify that the user 105 needs to be within the zone 101-*d*, or alternatively, within a zone (e.g., zone 101-*e*) that at least partially overlaps with the zone 101-*d* to view offers/events specific to zone 101-*d*. In this case, the user 105 may be able to view offers/events specific to zone 101-*d*, in addition to the offers/events specific to one or more of zones 101-*b*, 101-*c*, and 101-*e*. Furthermore, the user 105 may or may not be able to book or purchase the offer/event specific to zone 101-*d* depending for instance on a purchase rule specified by the business/entities associated with zone 101-*d*. In one non-limiting example, the user 105 may be able to purchase or book an offer provided by a first entity associated with zone 101-*d*, but unable to purchase or book an offer provided by a second entity associated with zone 101-*d* until the user 105 is within the zone 101-*d*. In another example, the user 105 may be unable to view and/or purchase events or offers provided by an entity if the user 105 has been blocked by the entity or business.

In some embodiments, the commerce platform (e.g., server 605) may determine the user 105's location based on the geolocation data received from the UE 110. Further, the commerce platform may transmit information related to offers/events specific to zones 101-*c*, 101-*b*, and 101-*e* to the UE 110, where the transmitting is based at least in part on determining that the user 105 is within those three zones and/or location rules associated with each of the offers/events. In such cases, the user 105 may be able to access, via the UE 110, the offers/events provided by one or more businesses within the zones 101-*c*, 101-*b*, and 101-*e*. It should be noted that the businesses themselves may or may not be located within the zone(s) 101 associated with the offers/events. As an example, a restaurant providing an offer (e.g., lunch-special) may be located within a zone 101 associated with said offer, while a brewery providing an offer (e.g., discounted drink tickets for use in a street fair) may be located at a different geographic location (e.g., outside the zone 101) than where the offer can be availed (i.e., the street fair in zone 101).

In some examples, a local business offering or event may be linked to one or more time-rules, where the time rules specify or define one or more of a cut-off time (e.g., 2 PM) by which a user is able to view/book/purchase an offer, a time range (e.g., between 2-4 PM) within which a user is allowed to view/book/purchase an offer, an event start time (e.g., 5 PM), and/or an event end time (e.g., 9 PM), to name a few. It should be noted that, the time rules associated with each of the plurality of offers/events may differ, based on the type of event or offer, the expected attendance, number of available spots, any special announcements or alerts (e.g., issued by the business, or alternatively, traffic/weather alerts), etc., further described below.

As an example, a time rule may only specify a cut-off time by which the user 105 has to purchase an offer, where the time rule may be linked to a location rule (e.g., user 105 has to be within zone 101-d by the cut-off time). Alternatively, the time rule may not be associated with any location rule, in which case the user 105 may be able to purchase the offer regardless of their location.

In another example, a time rule may specify that the user 105 can purchase an offer in a certain time window or range, where the time window ends before the start time or the end time. In this way, the present disclosure enables businesses to create and provide time-sensitive offers/events for customers to purchase via the commerce platform.

In some cases, a person (e.g., event manager, business owner, employee, marketing professional, local guides and other parties) promoting the event may compose media (e.g., non-fungible tokens (NFTs), digital image and photographs, live audio/video streaming, an audio/video recording which may or may not comprise a time <30 seconds in length), a digital advertisement, or other offer details (e.g., pricing information, such as a limited-time sale or discount) that can be displayed on the UE 110. As can be appreciated, the media and/or digital advertisement displayed on the UE 110 allows the event manager to provide more information about the event to the user 105 in a succinct, yet interactive, form. In this way, the present disclosure helps business owners to market their offers/events in a way that helps foster a more substantial and/or authentic connection with customers (i.e., new and/or existing customers).

In some embodiments, the system (or commerce platform) comprises an application (e.g., a mobile app, a web app). The application ("app") provides a user interface (UI) that can be displayed on different types of UEs (e.g., laptops, smart phones, tablet computers, etc.). As noted above, each of the UEs may be associated with a user, such as user 105, where the user may be a customer and/or a business owner.

As used herein, the terms "application", "app", "mobile app", "web app", "commerce app", and "marketplace" may be used interchangeably throughout the disclosure and may be used to refer to a software application, such as a mobile or web application, that can be accessed by customers and business owners, alike, to view and post events, respectively. In some cases, the marketplace or application may also allow a customer, such as user 105, to purchase an event/offer provided by an entity, book a reservation/appointment for an event/offer provided by an entity, sell a previously purchased event/offer to another user, etc., through the UE 100. Additionally, as used herein the terms "event" or "offer" may also include marketing content (e.g., to promote a new entity or business).

In some examples, the time rules and location rules may be dynamically linked, further described in relation to the figures below. In some cases, the time rules for one or more of the plurality of events/offers may be based at least in part on a start time and an end/expiration time, where the entity/business owner may specify the start time and the end time. In some embodiments, the commerce platform may cease displaying information about an event or offer upon expiration (i.e., when the current time is later than the end/expiration time for the event). In such cases, the user 105 may not be able to view/purchase/book the event/offer from the app accessed from the UE 110. In some cases, a business owner/event manager may configure the event start and end times via the marketplace/application. The marketplace/application accessed by the business owner/event manager may be the same or substantially similar to the application accessed by customers. In other cases, the commerce platform may provide two variants of the application/marketplace, one for customers (e.g., user 105 in FIG. 1, user(s) 605-a-d in FIG. 6) and one for event managers (e.g., event managers 615-a-d in FIG. 6). In either case, the business owner/event managers may access the application from a user device (e.g., UE 610-e in FIG. 6).

In some examples, the UI associated with the application provides a live feed that includes real-time or substantially real-time information related to one or more events/offers provided by one or more entities at or near the customer's location. Customers can view the one or more current events (or events happening in the near future, for instance, commencing within 1-2 hours) through the marketplace/application feed displayed on their UE, click on the event to view additional information (e.g., offer details) pertaining to the event, and optionally book or purchase the event/offer. In this way, the commerce platform helps link customer(s) in or near a given geographic area (e.g., downtown Denver) with one or more entities/businesses providing expiring offers/events in that geographic area. In some embodiments, the live feed displayed on the UE 110 may list the plurality of events/offers based on their current status. For example, the live feed may display a plurality of sets of events/offers, each set comprising at least one event or offer. A first set of events/offers displayed to the user 105 may include a list of events/offers that are "live" or currently available for booking/purchase, based on determining that the user 105 is within a particular zone 101 by a predefined cut-off time. A second list of events/offers displayed to the user 105 may include a list of events/offers that are in the vicinity of the user's location but require the user 105 to relocate to another zone (e.g., zone 101-d) to view/purchase/book the event. A third list of events/offers may include a list of events/offers that will be available for booking/purchase at a future time (e.g., current time is 7 PM, but sale starts at 8 PM), where the booking/purchase may or may not be subject to location rules (e.g., user 105 may need to be within the same zone or geofenced area when the sale starts at 8 PM, user 105 can purchase the event when the sale starts at 8 PM regardless of where they are located, etc.). A fourth list of events/offers may include a list of recently missed events/offers, for instance, events or offers that expired or ended recently (e.g., 10 minutes ago, 30 minutes ago, an hour ago, etc.). It should be noted that the example lists described above are not intended to be limiting and the commerce platform may generate and display different types of lists in different embodiments. Additionally, or alternatively, one or more of the lists described above (e.g., third list) may be optional. In some examples, users may dynamically view different events/offers in a different prioritization (e.g., different order or ranking) based on the users' distance to the event/offer location (e.g., events or offers that are located closer to a user may be ranked higher) and/or time remaining (e.g., events or offers expiring sooner may be ranked higher).

In some cases, the commerce platform may also allow customer(s), such as user 105, to purchase multiple tickets or offers (i.e., provided by the same or a different entity) via the application/marketplace. For instance, in some examples, the user 105 may utilize the application to purchase two or more tickets to a music concert, sports game, etc. Additionally, or alternatively, the user 105 may utilize the application to purchase a first ticket/offer provided by a business associated with the zone 101-e and another ticket/offer provided by another business associated with the zone 101-b. In such cases, the commerce platform assesses the start/end times, duration of event, etc., to determine if the user 105 is attempting to purchase offers for events that overlap in time.

Upon detecting an overlap, the commerce platform may transmit a notification or warning to the UE 110 indicating that two or more events overlap in time. In some instances, the commerce platform may prevent the user 105 from completing a transaction for an event that overlaps with a previously booked/purchased event. In this way, the commerce platform helps prevent duplicate and/or erroneous purchases and serves to safeguard user finances.

In some examples, the commerce platform may also allow entities to define different types of zones, such as, but not limited to, view zones and buy zones. One or both of the view and buy zones may dynamically change (e.g., reduce in area, expand in area) over time. In one non-limiting example, one or more of the view zone and the buy zone related to an event/offer may shrink (or reduce in area) closer to the start time and/or end time. In another example, one or more of the view zone and the buy zone related to an event/offer may expand (or increase in area) if the demand is low. In some embodiments, the user 105 may not be able to view an event if their current location (e.g., GPS location of the UE 110) is outside a view zone (e.g., zone 101-d) for an event/offer. Similarly, the user 105 may not be able to purchase an event/offer through the commerce platform (or another third-party payment platform) if their current location is outside the buy zone for said event/offer.

In some examples, customers may access events/offers in the live feed (i.e., displayed on the UE) based on their present location and as it relates to a view zone and/or a buy zone for each of the plurality of events or offers. For example, customers at different locations (e.g., in different zones) may view at least a portion of information related to different events/offers, where the visibility is based on the zone(s) in which a respective customer is located. In some cases, the customer may view some but not all information related to an event, such as an event name or title, whether the event is age restricted (e.g., 18 and over, 21 and over, under 16, to name a few), whether the event is a group or team event, an event start time, an event end time, and/or general pricing information (e.g., a price range, such as $25-50; a maximum price, such as <$50; a minimum price, such as >$40). This limited information may be displayed to all users/customers within the view zone, which gives potential customers a general idea of the event and whether it is within their budget, if they are eligible to purchase the offer or attend the event (e.g., based on their age), etc. In some aspects, providing this limited event/offer specific information to a user enables the user to make a preliminary assessment of an event before expending additional time, energy, and/or money to advance towards the buy zone. Furthermore, the commerce platform (e.g., server 605 in FIG. 6, system 900 in FIG. 9) may provide the user/customer with additional event/offer specific information, for instance, once the customer is within the buy zone for the event. This additional event specific information may include one or more of a specific price (e.g., $50) and additional offer details (e.g., dress code, such as business casual or formal attire; check-in time, for instance, 10 minutes before event start time; parking information, for instance, free parking, paid parking, or valet parking; whether food or refreshments are provided at the event, etc.), to name a few non-limiting examples.

It is further contemplated that the geofenced area for a zone, such as zone 101-f, may be based at least in part on speed or velocity information for the user 105. For example, the radius of zone 101-f may be larger when the user 105 is traveling at a faster velocity (e.g., via a car or train) as compared to when the user 105 is traveling at slower velocity (e.g., walking or biking). Thus, the location rules and/or time rules associated with an event/offer may vary based on user velocity information, and geofenced areas or zones may be defined differently for different users. In some embodiments, zones may also vary based on one or more of weather information and traffic information, i.e., for the location, such as city, county, where the event/offer is taking place.

It is further contemplated that the commerce platform may dynamically vary the price and discount (if any) for an event or offer based on market conditions (e.g., demand, number of users within a zone, number of users within 'X' miles of the event or offer location, amount of time remaining before event or offer expires, to name a few). As an example, the commerce platform may increase the price when the demand for an event/offer is high and lower the price when the demand is low. In some examples, the business or entity may be able to enable or disable dynamic pricing, for instance, through the mobile/web application associated with the commerce platform.

Turning now to FIG. 2, which illustrates an example of a user interface (UI) 200 displayed on a UE 210, in accordance with various aspects of the present disclosure. The UI 200 comprises a map 299, where the map 299 is similar or substantially similar to the map 100 described in relation to FIG. 1. The UI 200 may be associated with the application or marketplace (e.g., online marketplace) provided by the commerce platform (e.g., server 605 in FIG. 6, system 900 in FIG. 9) of the present disclosure. The UE 210 may implement one or more aspects of the UE 110 previously described in relation to FIG. 1. While FIG. 2 depicts the UE 210 as a smartphone, this is not intended to be limiting. Other types of UEs are contemplated in different embodiments, some non-limiting examples of which include a laptop, a tablet computer, and a NetBook. The UE 210 may include a geolocation module (e.g., GPS chip). In some cases, the geolocation module of the UE 210 may provide one or more of user location information and velocity information to the commerce platform (e.g., geolocation information receiving module 910 of system 900 in FIG. 9) in real-time or substantially real-time, which enables the commerce platform to dynamically (1) identify one or more events/offers for displaying to the user, (2) alter geofenced areas or zones, e.g., based on the obtained velocity information, and/or (3) alter time rules, such as a cut-off time for when the user associated with UE 210 has to be within a particular geofenced area or zone associated with an event/offer, to name a few non-limiting examples.

In some cases, a customer (e.g., user 105 in FIG. 1) may open an application (e.g., mobile app, web app) on the UE 210, where the opening may comprise downloading and accessing a software application. For example, the commerce platform, such as server 605 in FIG. 6, of the present disclosure may support the use of a mobile application, a website, and/or a web app for accessing the local commerce marketplace. Such a design may allow users with different types of UEs (e.g., smart phones, tablets, laptops, etc.) to access the marketplace to view and/or buy events/offers. In some cases, the geolocation module, such as GPS chip, of the UE 210 enables the customer to view their current location 202 through the UI 200 displayed on the UE 210. In some cases, the location information (e.g., GPS or geolocation information) for the UE 210 may be overlayed on a map, as shown in FIG. 2. In some cases, the maps 100, 300, and/or 400 described in relation to FIGS. 1, 3, and/or 4, respectively, comprise digital maps displayed on a user device or UE, such as UE 210.

As seen in FIG. 2, the UI 210 also displays a geolocation 203 for an event/offer and a plurality of zones 201 (or geofenced areas 201) surrounding the location 203. For instance, the UI 210 displays the current location 202 for the user (i.e., associated with UE 210), a first zone 201-a and a second zone 201-b related to the event/offer. Here, the first zone 201-a has a larger area than the second zone 201-b and the second zone 201-b is entirely surrounded by the first zone 201-a. In some other cases, however, the first zone 201-a may be larger than the second zone 201-b but may only partially overlap the second zone. In accordance with aspects of the present disclosure, the commerce platform may dynamically change which zone 201 (e.g., zone 201-b) the user has to be within (e.g., by a certain cut-off time) to avail the event/offer, e.g., view/purchase/book the event or offer. In some embodiments, the dynamic changing may be based at least in part on the location rules and/or time rules specified by the business owner/entity providing the event/offer at location 203.

In the example shown, the UI 200 also displays information related to the event or offer provided by the entity at the location 203, where the information includes one or more of event/offer details (e.g., event description 222), a time remaining to view/buy/engage the event (e.g., displayed in data field 225-b), and/or information related to how the view/buy/engage zone changes after a certain amount of time has passed (e.g., displayed in data field 225-a). As noted above, the geolocation 202 information received from the UE 210 may be associated with a timestamp, herein referred to as the "current time". Furthermore, the commerce platform/system may transmit a message to the customer/user, where the message indicates that the UE 210 is currently at location 202 within the first zone 201-a and that the zone for viewing/purchasing the event will shrink (e.g., by a radius of 1 mile) after a certain amount of time (e.g., 5 minutes 22 seconds) has passed from the current time. In some embodiments, the customer may not be able to view and/or buy the event or engage in any social aspects of the application if they are outside the second zone 201-b once that timer (e.g., 5 minutes and 22 seconds) has elapsed.

Thus, in some aspects, the zones 201 associated with an event or offer may dynamically change in shape and/or area, based at least in part on time rules (e.g., enforced using countdown timers) for the event/offer. In some aspects, the second zone 201-b may replace the first zone 201-a after the first countdown timer has elapsed. Furthermore, the commerce platform may enforce a second time rule corresponding to a cut-off time (e.g., 30 minutes and 22 seconds from the current time) by which the user is able to view, buy, and/or engage with the event. In some cases, the second time rule specifying the final or absolute cut-off time may also be associated with a location rule (e.g., the user has to be at location 203 within 30 minutes and 22 seconds from the current time before the viewing/purchase window expires, at which point the commerce platform ceases displaying any information related to the event/offer).

Figure 4:
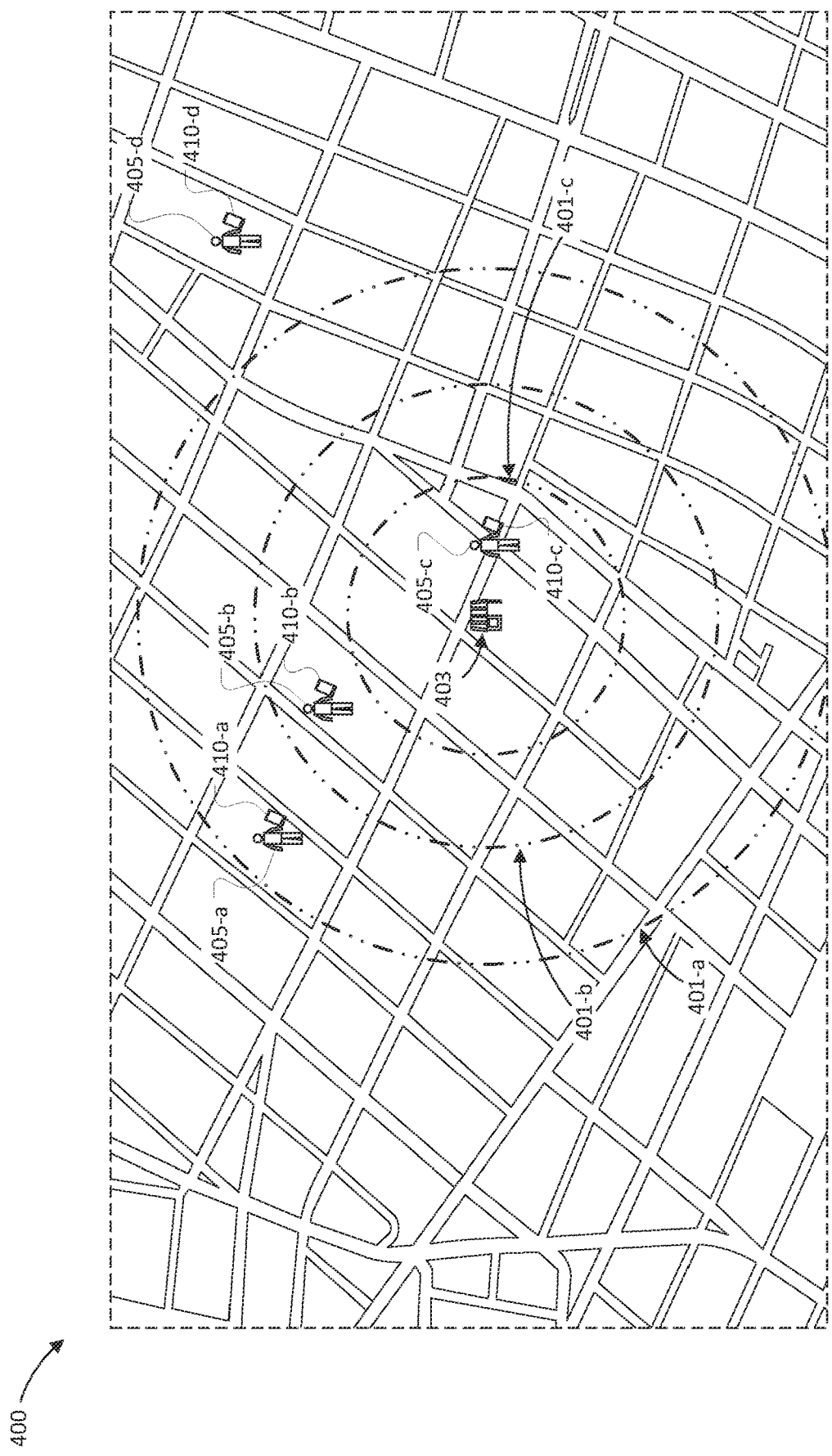
FIG. 4 depicts a plurality of zones overlayed on a geographic map, in accordance with various aspects of the present disclosure.

FIG. 4 illustrates a geographic map 400 (e.g., a digital map) showing a plurality of zones 401 (also referred to as geofenced areas 401) overlayed on said map 400, in accordance with various aspects of the present disclosure. The map 400, which may be an example of a digital map displayed on a UE, may be similar or substantially similar to one or more of the maps described herein, including at least map(s) 100, 299, and/or 300 described in relation to FIGS. 1, 2, and/or 3, respectively. In some embodiments, the disclosed commerce platform (e.g., server 605, system 900) is implemented in hardware and/or software. If at least a portion of the commerce platform/system is implemented using software, the commerce platform/system may include an application (e.g., mobile or web app having a UI) that is adapted to overlay one or more zones/geofenced areas 401 specified by one or more business owners/entities onto the map 400, where the map 400 may further display user location(s) for one or more user(s), at least one predefined location where a business/entity is providing an event or offer, to name a few non-limiting examples.

As seen in FIG. 4, the map 400 shows a location 403 (e.g., a GPS coordinate, a geolocation, a street address, a landmark, a street intersection, etc.) related to an event/offer. In one non-limiting example, the event/offer comprises a "live event". As used herein, the term "live event" may refer to an event that is currently available to view and/or buy (may or may not be subject to location rules, as previously described in relation to FIGS. 1 and 2). Alternatively, the term "live event" may refer to an ongoing event (i.e., start time of event is before current time and end time of event is after current time) that is still available to view and/or purchase. As an example, the event occurring at location 403 may be an example of a live event that is available to view/buy until a pre-defined cut-off time (e.g., 2 pm). The plurality of zones 401 (e.g., first zone 401-a, second zone 401-b, third zone 401-c) are overlayed on the map 400 to elucidate the dynamic relationship between zones 401-a-c, user locations (i.e., geolocations for users 405-a-d), and time more clearly.

Figure 9:
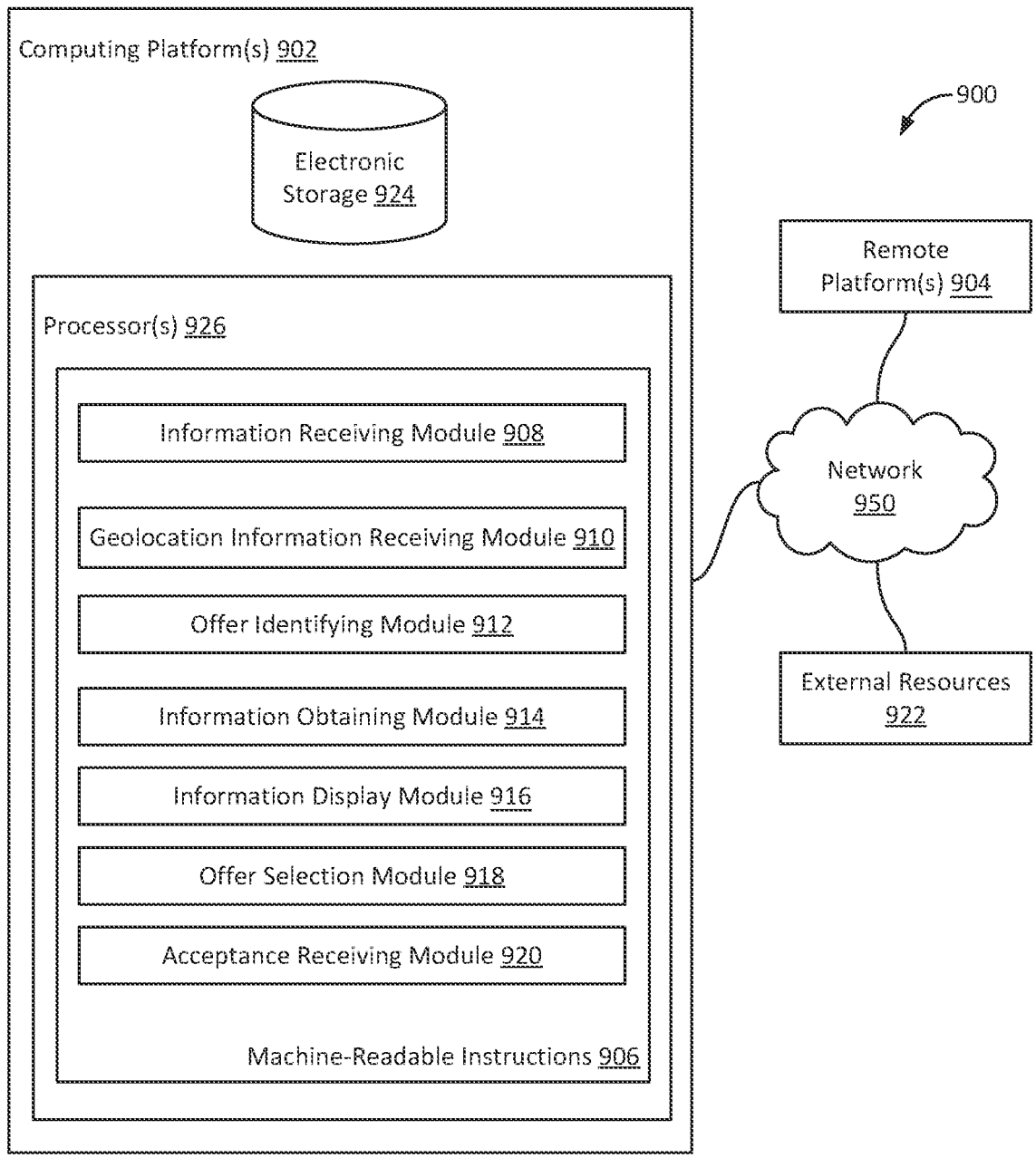
FIG. 9 illustrates a system configured for engaging customers using a computer platform, in accordance with various aspects of the disclosure.

As previously described, the commerce platform/system, such as system 900 in FIG. 9, may receive information related to a plurality of offers provided by a plurality of entities, including at least the offer/event at location 403. The information for each of the plurality of offers, including the offer or event at location 403, comprises one or more of location rules, time rules, and offer details (e.g., description of event or offer, as previously described in relation to FIGS. 1 and/or 2). In some cases, the information for the event/offer (i.e., scheduled to occur at location 403) may comprise the location 403 and geofencing information, where the geofencing information defines the one or more zones 401 surrounding the location 403. In this case, the geofenced areas or zones 401 are depicted as concentric circles surrounding the location 403, however this is in no way intended to be limiting. Other configurations (e.g., shapes, sizes, etc.) of geofenced areas/zones are contemplated in different embodiments, and the examples shown in FIG. 4 are not intended to be limiting. For example, FIG. 1 depicts a plurality of geofenced areas/zones of different shapes (e.g., circular, rectangular, irregular shape) and sizes (e.g., circles having different radii, rectangles having different lengths and/or widths). In some embodiments, the location rules for each of the plurality of offers/events may be defined in relation to the location (e.g., location 403) and the geofencing information (e.g., associated with zones 401-a-c) for a respective event/offer.

In this example, the event (maybe an ongoing event or an event occurring in the near-future at location 403) is live for a pre-defined time range (e.g., a time window spanning from 12:00 pm to 2:00 pm), where the time-range may be received from the business/entity providing the offer. During this time window, one or more of the users 405 (e.g., first user 405-a, second user 405-b, third user 405-c) may be able to view and/or buy the event offer, for instance, based on their current location. Each of the users 405 may be associated with a UE 410, where each UE comprises a geolocation chip or module (e.g., geolocation module 235 in FIG. 2). For instance, first user 405-a is associated with first UE 410-a, second user 405-b is associated with second UE 410-b, third user 405-c is associated with third UE 410-c, and fourth user 405-d is associated with fourth UE 410-d.

In some cases, the location rules and time rules may be linked or associated with each other, as further described below. For instance, the location rules may comprise information related to the plurality of zones/geofenced areas 401, and the time rules may comprise information related to a plurality of cut-off times (e.g., a first cut-off time for viewing the offer and a second, different cut-off time for purchasing the offer). As an example, the first zone 401-a may be linked or associated with a time rule for the event/offer, where the first zone 401-a dictates the region or area within which a user (e.g., any of users 405-a-d) should be located by a pre-defined time range in order to be eligible to purchase the event occurring at location 403. Here, a first location rule for the event/offer may be defined in relation to the location 403 and the first zone/geofenced area 401-a. Additionally, a first time rule for the first zone 401-a comprises one of a first time range (e.g., 11:00 am-1:00 pm; from 3 hours before event start time to 1 hour before event start time, where the event start time is 2:00 pm) and a first cut-off time (e.g., 1:00 pm, 1 hour before event start time, etc.). As seen in FIG. 4, user 405-a is within the first zone 401-a. Additionally, user 405-b is within first and second zones 401-a and 401-b, respectively, and user 405-c is within first, second, and third zones 401-a, 401-b, and 401-c, respectively. As used herein, the term "current time" may refer to a time (i.e., timestamp information) associated with the geolocation information received from a user device or UE 405. As previously noted, the commerce platform/system is configured to obtain the geolocation information, i.e., from one or more UEs running the application associated with the commerce platform, where the geolocation information is obtained in real-time or substantially real-time (e.g., a small or negligible delay under 100 milliseconds, under 70 milliseconds, etc.).

Some aspects of the present disclosure are directed to identifying, from a plurality of offers, at least one offer for displaying to a user (e.g., user 405-a) associated with a UE 410-a. In some cases, the identifying is based at least in part on the geolocation information (e.g., real-time geolocation information received from the UE 410-a), and information related to each of the plurality of offers provided by a plurality of entities.

In some instances, identifying at least one offer (i.e., a subset of offers) from a list including the plurality of offers comprises evaluating whether the timestamp and the geolocation information for a user passes (i.e., satisfies or meets) the time rules and location rules. For instance, after determining the timestamp (e.g., 12:53 pm) associated with the geolocation information received from the UEs 410, the commerce platform/system (e.g., system 900 in FIG. 9) may determine, for each of the plurality of offers, whether (1) the timestamp (i.e., 12:53 pm) associated with the geolocation information received from each of the UEs is within the first time range (e.g., 11:00 am-1:00 pm) and/or before the first cut-off time (e.g., 1:00 pm), and (2) whether a respective user location corresponding to each geolocation information is within at least one of the plurality of zones or geofenced areas 401. In some cases, if the timestamp and the geolocation information associated with a user (or UE) meets both the conditions (1) and (2) discussed above, the commerce platform identifies an offer associated with the time and location rules as a candidate for displaying to the user. For instance, in FIG. 4, the offer associated with the location 403 and first zone 401-a is identified as a candidate offer for displaying to the user 405-a based on determining that both the current time (e.g., 12:53 pm) and the user 405-a location respectively pass the time rule and the location rule for the first zone 401-a.

In some embodiments, the second zone 401-b may be linked or associated with a second time rule and a second location rule, where the combination of the second time and location rules may specify that a user may have to be within the second zone 401-b, for instance, after 1:00 pm. In one non-limiting example, the second time and location rules may specify that, closer to the event start time (e.g., between 1:00 pm-2:00 pm), user(s) may have to be within the second zone 401-b in order to view and/or purchase the event offer for location 403. In this example, as long as a user (e.g., third user 405-c) is within the third zone 401-c, they may be able to view/purchase the event until the final cut-off time (e.g., 2:00 pm, which may be an event start time or event expiration time). Thus, as seen, the location and time rules corresponding to the different zone(s) 405 provide for smaller geofenced areas or zones closer to the event start time (or alternatively, expiration time), which helps ensure that the events/offers are displayed to customer(s) having a high likelihood (e.g., >90%, >95%, >75%, where the probability threshold may be indicated by the entity or business owner) of arriving at the event on time (e.g., before the event start time, before the event expiration time).

Thus, some aspects of the present disclosure are directed to techniques for engaging customers (e.g., customers that are within a threshold distance from the event location 403 by a pre-defined time) by promoting events/offers that are in the vicinity of said customers. In some instances, the commerce platform (e.g., system 900) utilizes the most recent geolocation information (e.g., last known location) for a UE 410 to determine one or more offers, events, and/or marketing promotional content to display to a user.

Additionally, or alternatively, some aspects of the present disclosure are directed to identifying a subset of events/offers (i.e., from a larger set including a plurality of events/offers) for displaying to a user, based at least in part on assessing which of the events/offers are sufficiently close (i.e., in travel time and/or travel distance) to the user. In some aspects, the techniques described herein may help enhance customer satisfaction, e.g., by prioritizing customers/users that have a higher likelihood of attending an event based on their proximity to said event in lieu of other customers/users that are booked/reserved for the event but unlikely to arrive in time, which alleviates some of the frustration caused by businesses or entities overbooking slots/tickets/appointments. In some aspects, the techniques described herein also help enhance business growth, allow businesses to reach out to new customers, drive sales, and/or enhance customer satisfaction.

As seen in FIG. 4, the fourth customer or user 405-d associated with the UE 410-d is located outside all of zones 401-a-c surrounding the event/offer location 403. In one non-limiting example, the outermost zone 401-a may be an example of a view zone, while zones 401-b and 401-c may be examples of buy zones associated with different time and location rules. In this case, the commerce platform/system may not display any information (or alternatively, may only display limited information, such as a brief event description and a purchase cut-off time) since the user 405-d is located outside the view zone 401-a.

It is further contemplated that the first zone 401-a may be an example of a buy zone and the location 403 may not be associated with any distinct view zones. Alternatively, the first zone 401-a may be an example of a buy zone and a view zone associated with offer location 403 may be several times larger than the buy zone 401-*a*. In the latter case, the UE 410-*d* and user 405-*d* may be located within this view zone, even though this view zone is not depicted in FIG. 4. In either case, in some embodiments, it is contemplated that the customer 405-*d* may be able to view the event/offer associated with location 403 but restricted from purchasing said event because the geolocation information received from the UE 410-*d* corresponds to a user location that is located outside of the buy zone 401-*a*.

In yet other cases, the buy zone and the view zone may be the same, herein referred to as a buy-view zone. In one non-limiting example, the zone 401-*a* may be an example of a buy-view zone, while zones 401-*b* and 401-*c* may be examples of buy zones.

In some cases, the buy zones may shrink over time (e.g., from zone 401-*a* to zone 401-*b* to zone 401-*c*) as the current time approaches the cut-off time (e.g., start time or expiration time) for the event or offer.

Figure 3:
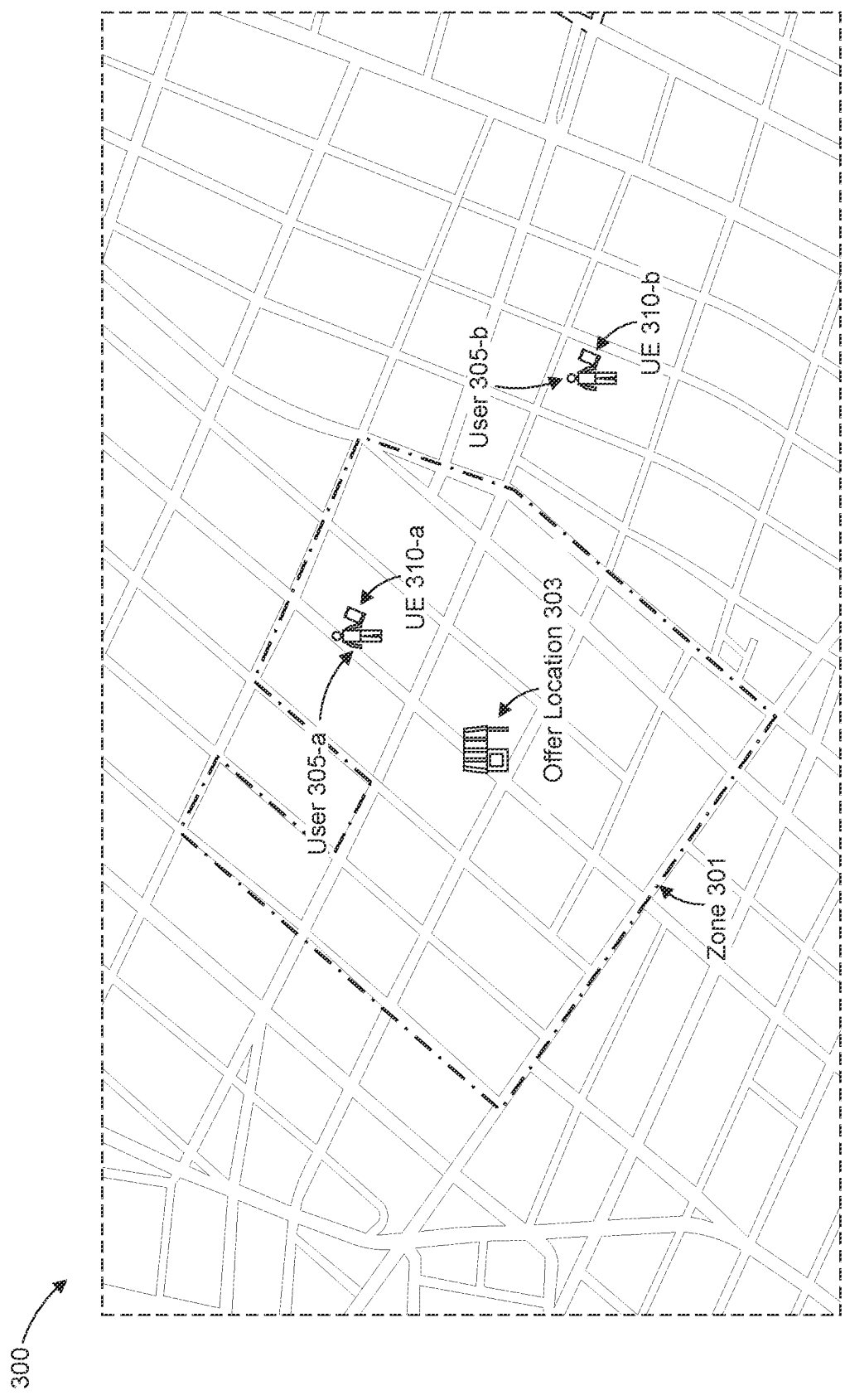
FIG. 3 depicts a plurality of zones overlayed on a geographic map, in accordance with various aspects of the present disclosure.

FIG. 3 illustrates a geographic map 300 showing a zone 301 (also referred to as geofenced area 301) overlayed on said map 300, in accordance with various aspects of the present disclosure. FIG. 3 also shows a plurality of users 305, each associated with a user equipment (UE) 310. For example, user 305-*a* is associated with UE 310-*a*, while user 305-*b* is associated with UE 310-*b*. Each UE 310 may include geolocation capabilities, such as a GPS chip, which allows the location of the UEs 310 and/or users 305 to be tracked in real-time or substantially real-time.

The map 300, which may be an example of a digital map displayed on a UE, may be similar or substantially similar to one or more of the maps described herein, including at least map(s) 100, 299, and/or 400 described in relation to FIGS. 1, 2, and/or 4, respectively. In some embodiments, the disclosed commerce platform (e.g., server 605, system 900) is implemented in hardware and/or software. If at least a portion of the commerce platform/system is implemented using software, the commerce platform/system may include an application (e.g., mobile or web app having a UI) that is adapted to overlay the zone or geofenced area 301 onto the map 300. As noted above, the zone or geofenced area 301 may be specified by a business owner, event manager, or another applicable entity associated with the offer location 303. The offer location 303 comprises (or is associated with) geolocation information (e.g., GPS data), a street address, a street intersection, tourist site or landmark, an airport, a specific terminal or gate at an airport, to name a few non-limiting examples. As seen, the map 300 may further display user location(s) for one or more user(s), including at least users 305-*a* and 305-*b*, at least one predefined location, such as location 303, where a business/entity is providing an event or offer, to name a few non-limiting examples.

As seen, FIG. 3 depicts the zone 301 overlayed on the geographic map 300 (or simply, map 300). In this example, the customer or user 305-*a* associated with UE 310-*a* is within the geofenced area or zone 301 associated with an event, where location 303 corresponds to the location of the event/offer. The geofenced area/zone 301 may be an example of a buy zone, a view zone, or a buy-view zone. Further, another user 305-*b* (i.e., associated with UE 310-*b*) is at a location that is outside the event's geofenced area or zone 301. In some cases, the user 305-*b* may not be able to view and/or buy the event/offer, since the user 305-*b* is not within the event's geofenced view or buy zone. In some other cases, the user 305-*a* may be able to view and/or buy the event, since the user 305-*a* is within the event's geofenced view or buy zone. In some cases, the event manager or business owner may specify the geofencing, geolocation, and/or zone rules for viewing/buying event offers through the marketplace or application of the commerce platform. For example, the event manager may be able to configure one or more time rules (e.g., event start/end times; a cut-off time for different zones, as explained above in relation to FIG. 4; time(s) at which a first zone reduces or increases in size/area to become a second zone; and any other applicable time rules, also described above in relation to FIG. 4) and/or location rules (e.g., a radius of a zone if the zone is circular; three or more GPS coordinates, where adjacent GPS coordinates are connected using straight lines to define a zone or geofenced area, to name a few).

In some examples, the location rules for the event/offer may be defined in relation to the location 303 and the geofencing information (e.g., start and end GPS coordinates for each line segment of the geofenced area/zone 301). Alternatively, the location rules may be defined with respect to (1) the event/offer location 303, or another landmark, and/or (2) a geographic area, such as a state, a county, a city, a certain district in a city, an area bounded by a plurality of intersecting streets, a street name or street address, a park, to name a few non-limiting examples.

In some cases, the commerce platform/system, such as system 900 in FIG. 9, may access or receive one or more other applicable rules (e.g., a rule specifying that a user has to be near one or more other users and in the same geofenced area or zone, since the event is a group event; a rule specifying that a user has to meet a certain age criteria, for instance, at least 18 or 21 years old, less than 18 or 16 years old, to name a few. It should be noted that the marketplace/application associated with the disclosed commerce platform/system may allow an entity (e.g., event manager, business owner) to specify other rules in addition to, or in lieu, of the above, and the examples listed herein are not intended to be limiting.

It should be noted that the rule-based scenarios described above and elsewhere in the disclosure are not intended to be limiting, and other implementations are contemplated in different embodiments.

Figure 5:
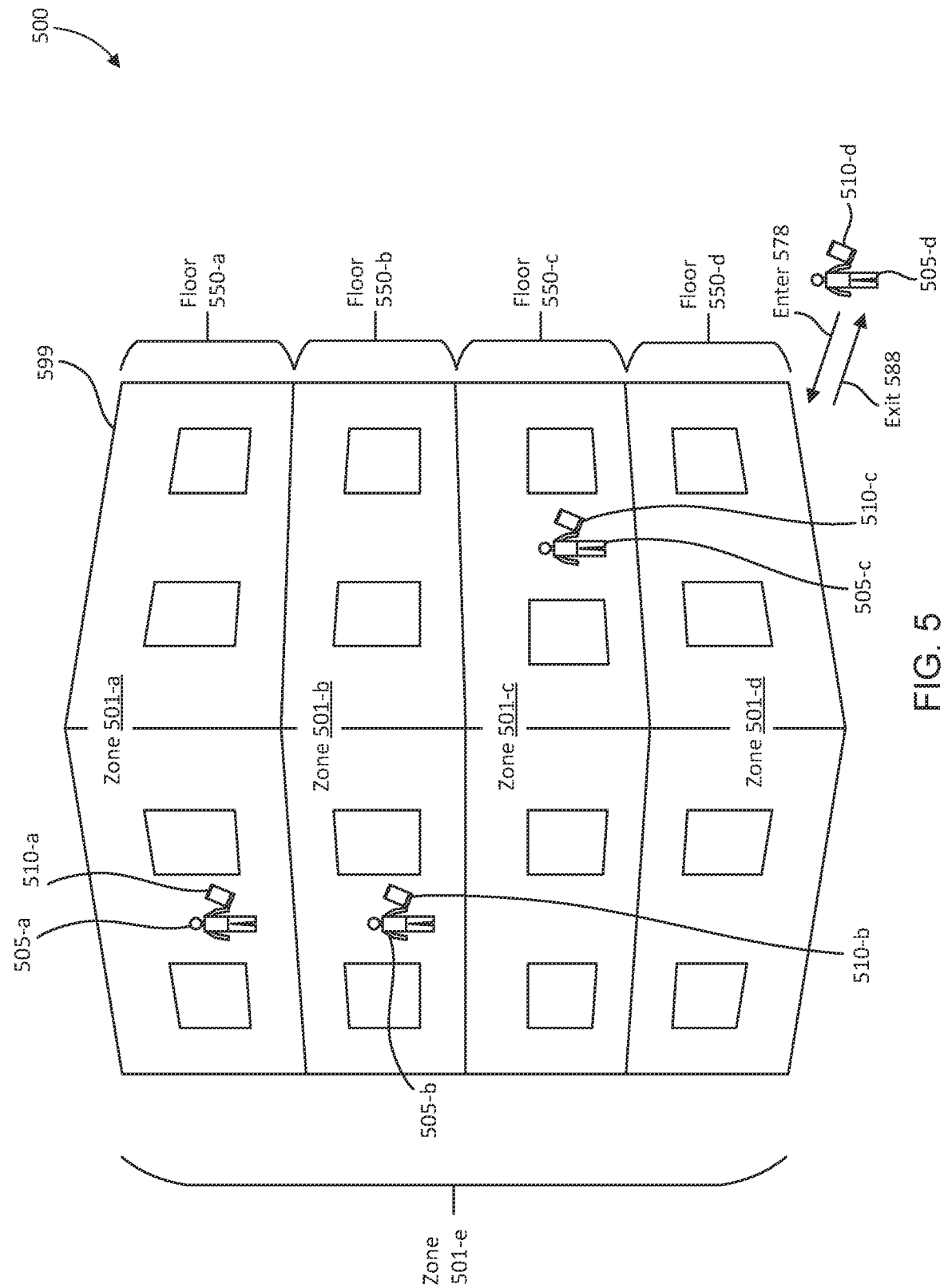
FIG. 5 depicts a plurality of zones at a single geographic location, such as a building, in accordance with various aspects of the present disclosure.

FIG. 5 depicts a conceptual diagram 500 showing a plurality of zones at a single geographic location, such as building 599, in accordance with various aspects of the present disclosure. In some cases, the commerce platform (e.g., system 600 comprising server 605; system 900) allows multiple zones to be defined at a single geographic location, such as, but not limited to, a building, an arena, a shopping mall, a cruise ship, an airport, etc. In this example, the building 599 comprises a plurality of floors (e.g., floor 550-*a*, floor 550-*b*, floor 550-*c*, floor 550-*d*), where each floor 550 comprises one of the plurality of zones. As discussed in relation to FIG. 5, the terms "floor 550" and "zone 550" may be used interchangeably. Furthermore, the zones 550 may implement one or more aspects of the zones 101, 201, 301, and/or 400 described in relation to FIGS. 1, 2, 3, and/or 4, respectively. For example, one or more of the zones 550 (or floors 550) may be associated with a business/entity, an event/offer, or both. One or more of the floors 550 may be used to host an event (e.g., a concert or class), provide a service (e.g., haircut or massage), and/or sell an offer (e.g., clothing or electronics in a retail setting, food and drinks in a restaurant). In some cases, one or more users (e.g., user 505-*a*, user 505-*b*, user 505-*c*) may be located in the building 599. In this example, the first user 505-*a* is located within zone 550-*a*, the second user 505-*b* is located within zone 550-*b*, and the third user 505-*c* is located within zone 550-*c*. Currently there are no users located within the zone or floor 550-*d*.

In some cases, aspects of the present disclosure allow users at the same or similar geolocation (e.g., the same street address, the same building, the same arena or stadium, etc.) to view/buy different events or offers based on their specific location (e.g., floor number, seat row, section or gate number, airport terminal, etc.) within the same "general location". As used herein, the term "general location" may refer to a larger location or structure, such as the building 599, a shopping mall, an airport, etc., that is subdivided into smaller units or locations (e.g., floors 550). Each of these smaller locations, such as floors 550, may or may not be associated with a zone 501. In some examples, the general location (e.g., building 599) may be associated with another zone, such as zone 501-*e*, where the zone 501-*e* may be distinct from the smaller zones 501-*a* through 501-*d* within it. For instance, the building 599 may be associated with the fifth zone 501-*e*, where the fifth zone 501-*e* may be configured using different time and/or location-based rules. In one non-limiting example, each of users 505-*a*-*c* may be able to view and/or buy an event offer associated with the zone 501-*e* since they are all within the fifth zone 501-*e* corresponding to the building 599. Alternatively, the commerce platform may restrict all of users 505-*a*-*c* from viewing and/or buying the event offer (i.e., specific to the fifth zone 501-*e*) based on determining that the users 505-*a*-*c* are within the fifth zone 501-*e*. In some cases, if a user (e.g., user 505-*d*) exits 588 the building 599, they may be able or unable to view/buy the event or offer associated with the zone 501-*e* since they are outside the fifth zone 501-*e*. Similarly, if the user 505-*d* enters 578 the building 599 and goes to a floor (e.g., floor 550-*b*), they may be able to view/buy the event associated with that floor, such as, the event associated with the zone 501-*b* and visible to the user 505-*b* on the floor 550-*b*. In yet other cases, an event may only be available for users located in zones corresponding to even level floors (e.g., floor 550-*c* and floor 550-*a*), for instance, zones 501-*a* and 501-*c*. In this case, users 505-*a* and 505-*c* may be able to view/buy the event through the application or UI displayed on their user device 510, while users 505-*b* and 505-*d* may not be able to view/buy the same event.

In some examples, the commerce platform/system of the present disclosure determines a user's specific location (e.g., floor number) within the general location (e.g., building 599) based on one or more of geolocation data (e.g., GPS data), altitude or atmospheric pressure data, Wi-Fi signal data, cellular or mobile data, and/or compass data, to name a few non-limiting examples. The data used to determine the user's specific location within the larger general location may be received from the UE 510 associated with the user, a UE or computing platform associated with the business owner/entity providing the offer in the zone/floor where the user is located, or a combination thereof. For example, when the user 505-*d* enters 578 the building 599 on floor 550-*d*, a UE or computing platform associated with an entity may identify that a new UE 510-*d* has entered the zone 501-*d* associated with floor 550-*d*. The UE/computing platform associated with the entity (i.e., the entity providing an event/offer in zone 501-*d* of floor 550-*d*) may transmit information related to the UE 510-*d* to the commerce system/platform, where the information may include an email address, a phone number, an IP address, a MAC address, or any other applicable information. Additionally, or alternatively, the UE 510-*d* may transmit information related to the UE/computing platform associated with the entity to the commerce platform, where the information may include a list of Wi-Fi networks (e.g., if each floor 550 comprises a different Wi-Fi network), a relative signal strength of the different Wi-Fi networks (e.g., the Wi-Fi network associated with floor 550-*c* may have a stronger signal than the Wi-Fi networks associated with floors 550-*a* and 550-*b* when measured from floor 550-*d*), or any other applicable information. The commerce system/platform can then use the information received from one or more of the UE 510-*d* and the UE/computing platform associated with the entities of floors 550-*a*-*d* to determine that the user 505-*d* entered the building 599 on floor 550-*d*. In this way, the commerce platform/system can then display at least one event/offer associated with the zone 501-*d* on the UE 505-*d*. In other cases, the mobile application on the UE 510-*d* may prompt the user 505-*d* to enter their specific location (e.g., floor number) upon determining that the user 505-*d* has entered a location (e.g., building 599, zone 501-*e*) that is subdivided into a plurality of other zones.

Figure 6:
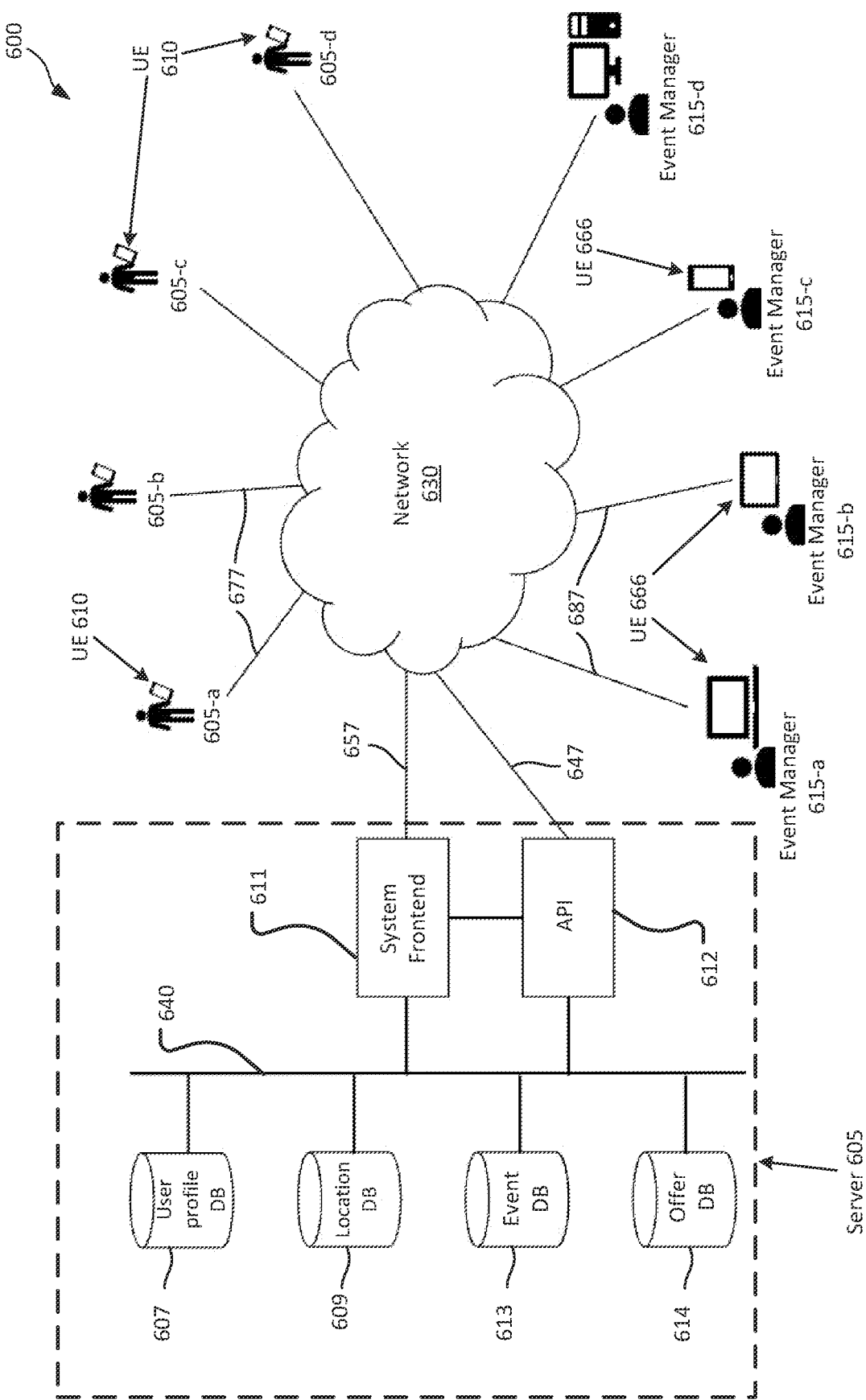
FIG. 6 illustrates an example of a platform or system configured for supporting local commerce, in accordance with various aspects of the present disclosure.

FIG. 6 illustrates an example of a commerce platform 600 (also referred to as system 600) configured for supporting local commerce, according to various aspects of the present disclosure. As seen, the commerce platform/system 600 comprises a server 605, where the server 605 comprises or is linked to one or more databases (also referred to in the figures and/or herein as "DB"), such as a user profile DB 607, a location DB 609, an event DB 613, and/or an offer DB 614. The server 605 further includes a system frontend 611 and an Application Programming Interface (API) 612. Each of the components of server 605 may be electronically, logically, and/or communicatively coupled to each other using one or more buses 640. In some cases, the user profile DB 607 may store user profile information (e.g., name; email; telephone number; address; age; preferences or interests; type of user equipment, such as smartphone, tablet, laptop, etc.) for each user 605. Further, the location DB 609 may store location information for each user 605 (e.g., user 605-*a*, 605-*b*, 605-*c*, 605-*d*) and/or location information for one or more events (e.g., location where each event is taking place; location information for the different zones corresponding to each event, which may include the cut-off time at which a first zone ends or reduces in size and is replaced by a second zone; and any other applicable location information, as previously described in relation to FIGS. 1-5).

In some examples, the event DB 613 may store information for each of the plurality of events, such as, but not limited to, an event description, time information (e.g., start/end times, time(s) at which different zones end or are replaced by other zone(s), cut-off times for different zones, where the cut-off times may be linked to one or more location rules, etc.), and any other relevant information (e.g., event is limited by age, event is cash-only, customer/user has to arrive at least 'X' minutes in advance of event start time to check-in, coat check provided at event, no parking at event, to name a few non-limiting examples). Further, offer DB 614 may store information related to event offers, such as: a list of users/customers 605 who have purchased an event offer via the system 600, pricing information for the event, discounts (if any) available to users/customers 605, number of event offers (e.g., tickets, tables for reservation, reservation or booking slots, etc.) still available for purchase or booking, to name a few non-limiting examples. In some embodiments, one or more of the DBs may be optional. Alternatively, a single DB may be used in lieu of two or more separate DBs (e.g., event DB 613 and offer DB 614 may be combined into a single events/offers DB).

The system frontend 611 may be configured to support the application (also referred to as marketplace) accessed by the users 605 and/or event managers (e.g., event managers 615-*a* through 615-*d*) from the UEs 610 and 666, respectively. In this example, each of the customers/users 605 is associated with a UE 610, where the UE 610 may be an example of a geolocation or GPS-enabled UE. Additionally, each of the event managers 615 may be associated with a UE 666, where the UE 666 may or may not be GPS enabled. For instance, one or more of the UEs 666 may not include a GPS chip (or geolocation module) since they are intended to be non-portable (e.g., desktop computers, servers).

In some cases, the system frontend 611 may generate the UI displayed on one or more of the UEs 610 and UEs 666. In some embodiments, the system frontend 611 may generate multiple variants of the UI, for instance, a first variant that can be accessed by users/customers 605 and a second variant that can be accessed by event managers 615. Additionally, or alternatively, the system frontend 611 may generate a first UI variant for GPS enabled UEs (e.g., UEs 610) and a second UE variant for UEs (e.g., one or more of UEs 666) without GPS or geolocation capabilities. In yet other cases, different UI variants may be generated for different operating systems (e.g., ANDROID, APPLE IOS, MAC OS, MICROSOFT WINDOWS, CHROME OS, etc.). In some embodiments, the different UIs generated for customers 605 and event managers 615 may provide different functionality or features (e.g., customers 605 may not be able to specify location and/or time rules or may have limited to no editing access via the UI, whereas event managers 615 may be able to specify location and time rules and may be provided editing access via the UI).

In some embodiments, the system frontend 611 may receive information from the one or more databases (e.g., user profile DB 607, location DB 609, event DB 613, and/or offer DB 614) of the server 605. Additionally, the system frontend 611 may work in conjunction with the API 612 to transmit, via network 630, information pertaining to generating and displaying the UI on the UEs 610 and UEs 666. As seen, users 605 and/or event managers 615 may access the system over a network 630, which may be an example of a wireless communication network (e.g., cellular network, such as 3G/4G/5G, Wi-Fi, Bluetooth, etc.), and receive/transmit information to the server 605. FIG. 6 also depicts a plurality of communication links, including communication links 677 for transmitting/receiving information between the UEs 605 and network 630, communication links 687 for transmitting/receiving information between the UEs 666 and the network 630, communication link 657 for communicating with the system frontend 611, and communication link 647 for communicating with the API 647. One or more of the communication links 647, 657, 677, and/or 687 may be bi-directional communication links.

In some examples, the server 605 may retrieve geolocation information from the UEs 610 associated with the customers/users 605 and display offers/events based on a respective location of each user 605. For instance, the server 605 of the commerce platform/system 600 may display an event/offer to a user (e.g., user 605-*a*) based on determining that (1) the user 605-*a* is within a zone associated with the event/offer, (2) the geolocation information passes the location rules, (3) the timestamp associated with the geolocation information received from the UE passes the time rules, or (4) a combination thereof. As described above in relation to FIGS. 1-5, a geofenced area for a zone may dynamically change over time, for instance, become smaller when the current time is closer to a cut-off time (e.g., event start time, event expiration time).

In some examples, the server 605 may also receive information pertaining to a plurality of events or offers provided by the one or more event managers 615, where the information may be received via their UEs 666. This information may include, but is not limited to, event descriptions, pricing information (including discounts, if any), time rules, location rules, location and geofencing information for at least one of the plurality of events/offers, promotional information for at least one of the plurality of offers, start and end times for events, etc. In some examples, the geofencing information is used to define one or more zones surrounding the location. The geofencing information for at least one of the events or offers may or may not include information for expanding or contracting the zone dimensions/area over time, and any other applicable information. In some examples, the location rules for each of the plurality of offers are defined in relation to the location and the geofencing information for at least one of the offers. Furthermore, in some embodiments, the promotional information received from the one or more event managers 615 may comprise one or more of media (e.g., non-fungible tokens, digital images or photographs, real-time audio streaming data, real-time video streaming data, an audio recording, and/or a video recording), a digital advertisement, and a notice or announcement specific to at least one of the events or offers.

It is further contemplated that FIG. 6 may comprise a configuration for engagement between UEs 610, users 605*a*-605*d*, event managers 615*a*-615*d*, and a third-party social media platform. In such an embodiment, offers for events may be displayed in the third-party social media platform, transactions involving the offers/events may occur through a third-party social media platform transaction service, and social engagement with the event/offer may be provided by features associated with the third-party social media platform.

Figure 7:
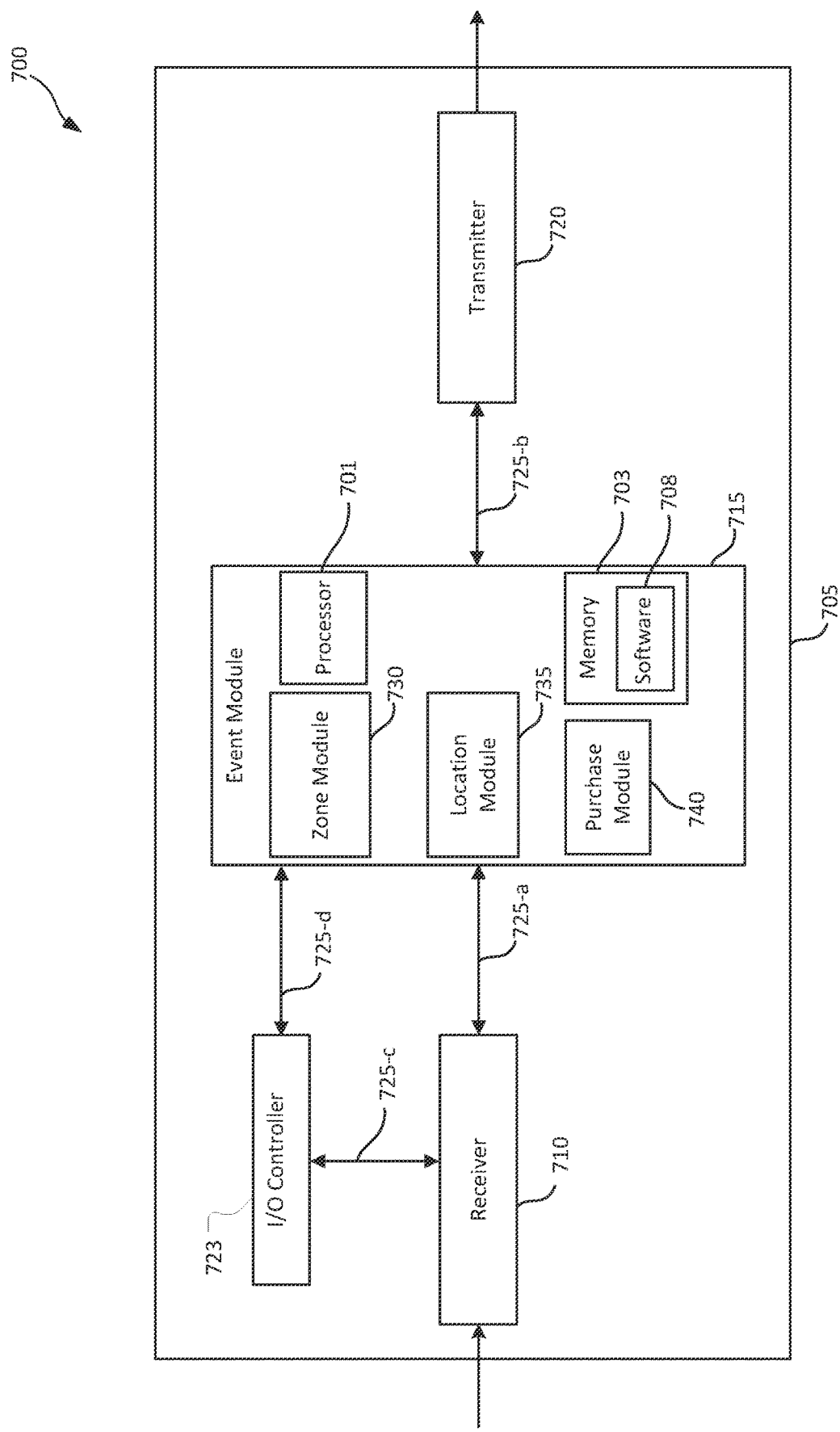
FIG. 7 illustrates an example of a computing system configured for supporting local commerce, in accordance with various aspects of the present disclosure.

FIG. 7 illustrates a block diagram 700 of a computing system 705 configured for supporting social commerce, in accordance with various aspects of the present disclosure. Computing system 705 may implement one or more aspects of the server 605, previously described in relation to FIG. 6. Computing system 705 may include a receiver 710, an event module 715, and a transmitter 720. Computing system 705 may also include a processor 701, a memory 703, a software 708, and an input/output (I/O) controller 723. Memory 703 may include random access memory (RAM) read only memory (ROM). The memory 703 may store computer-readable, computer-executable software 708 including instructions that, when executed, cause the processor to perform various functions described herein. In some cases, the memory 703 may contain, among other things, a basic input/output system (BIOS) which may control basic hardware and/or software operation such as the interaction with peripheral components or devices. Software 708 may include code to implement aspects of the present disclosure, including code to support local commerce. Software 708 may be stored in a non-transitory computer-readable medium such as system memory or other memory. In some cases, the software 708 may not be directly executable by the processor but may cause a computer (e.g., when compiled and executed) to perform functions described herein. Each of these components of computing system 705 may be in communication with one another (e.g., via one or more buses, such as buses 725-*a*, 725-*b*, 725-*c*, 725-*d*). In some cases, the receiver 710 and the transmitter 720 may collectively be referred to as a transceiver.

In some examples, the event module 715 comprises one or more modules, such as a zone module 730, a location module 735, and a purchase module 740. The modules may be embodied in hardware, software, or a combination thereof. The event module 715 and/or one of its sub-modules (e.g., zone module 730, location module 735, and a purchase module 740) may be configured to perform one or more of the methods and operations described throughout this disclosure.

In some embodiments, the processor 701 may include an intelligent hardware device (e.g., a general-purpose processor, a digital signal processor or DSP, a central processing unit or CPU, a microcontroller, an ASIC, an FPGA, a programmable logic device, a discrete gate or transistor logic component, a discrete hardware component, or any combination thereof). In some cases, processor 701 may be configured to operate a memory array using a memory controller. In other cases, a memory controller may be integrated into processor 701. Processor 701 may be configured to store computer-readable instructions stored in a memory to perform various functions (e.g., functions or tasks supporting a local social commerce platform). In some cases, the transmitter 720 may transmit signals generated by other components of the device. In some examples, the transmitter 720 may be collocated with the receiver 710 in a transceiver module. While not shown, the receiver 710 and/or the transmitter 720 may include a single antenna, or a set of antennas.

FIG. 9 illustrates a system 900 configured for engaging customers using a computer platform, in accordance with various aspects of the disclosure. In some implementations, system 900 may include one or more computing platforms 902. Computing platform(s) 902 may be configured to communicate with one or more remote platforms 904 according to a client/server architecture, a peer-to-peer architecture, and/or other architectures. Remote platform(s) 904 may be configured to communicate with other remote platforms via computing platform(s) 902 and/or according to a client/server architecture, a peer-to-peer architecture, and/or other architectures. Users may access system 900 via remote platform(s) 904. Some non-limiting examples of the remote platform(s) 904 may include the UE 110, UE 210, UEs 310, UEs 410, UEs 510, UEs 610, and/or UEs 666, described above in relation to FIGS. 1-6.

Computing platform(s) 902 may be configured by machine-readable instructions 906. Machine-readable instructions 906 may include one or more instruction modules. The instruction modules may include computer program modules. The instruction modules may include one or more of information receiving module 908, geolocation information receiving module 910, offer identifying module 912, information obtaining module 914, information display module 916, offer selection module 918, acceptance receiving module 920, and/or other instruction modules.

Information receiving module 908 may be configured to receive information related to a plurality of offers (or events) provided by a plurality of entities. By way of non-limiting example, the information for each of the plurality of offers (or events) may include one or more of location rules, time rules, and offer details (or event details). By way of non-limiting example, the time rules for each of the plurality of offers may include one or more of a start time, an end time, one or more cut-off times, and a time range. By way of non-limiting example, the offer details for each of the plurality of offers may include one or more of pricing information, promotional information, and information related to one or more of age requirements and group size requirements. By way of non-limiting example, the media may include one or more of non-fungible tokens (NFTs), digital images or photographs, real-time audio streaming data, real-time video streaming data, an audio recording, and a video recording. In some examples, the commerce platform may allow local businesses or entities to create and submit general marketing videos (or any other applicable marketing content for promoting their business) that may or may not be tied to a specific event or offering. In some embodiments, the pricing information may include different types of pricing information, such as, but not limited to, pricing information for adults, pricing information for seniors, pricing information for students or young children, pricing information for veterans or members of the armed forces, and/or group pricing information. In some instances, the group pricing may be static (e.g., groups of 3 or more get a flat 10% discount as compared to pricing rates for individuals) or dynamic (e.g., group of customers can get a volume price reduction for every customer that agrees to purchase the event or offer). In some instances, the pricing information for the event or offer may be based on time remaining (i.e., before event or offer expires), distance from event/offer location, customer information (e.g., new or previous customer), group information (e.g., different pricing rates may be provided for groups vs individuals), and/or social media specific information (e.g., different pricing rates may be provided based on whether a user has followed or "liked" the business on a social media platform).

The location rules may include information related to a plurality of zones or geofenced areas, such as the zones or geofenced areas described above in relation to FIGS. 1-5. By way of non-limiting example, the time rules may include information related to a plurality of cut-off times, or one cut-off time for each of the plurality of zones or geofenced areas (e.g., zones 101-*a-f*, zones 201-*a-b*, zone 301, zones 401-*a-c*, etc.). Evaluating, for each of the plurality of offers, whether the timestamp and the geolocation information pass the time rules and location rules may include determining whether a user location corresponding to the geolocation information is within at least one of the plurality of zones or geofenced areas and determining whether the timestamp associated with the geolocation information is before a respective cut-off time for the at least one zone or geofenced area, as described above in relation to FIGS. 1-4. The location rules may include information related to a plurality of zones, including at least a first buy zone and a first view zone, as described above in relation to FIGS. 1-5.

Geolocation information receiving module 910 may be configured to receive geolocation information from a user device (e.g., UE 110, UE 210, etc.). The identification of at least one offer (or event) from the plurality of offers (or events) may be further based on determining a timestamp associated with the geolocation information received from the user device. The identification of at least one offer from the plurality of offers may be further based on evaluating, for each of the plurality of offers, whether the timestamp and the geolocation information pass the time rules and location rules, as described above in relation to at least FIGS. 2 and/or 4. By way of non-limiting example, the identification of at least one offer (or event) may be further based at least in part on one or more of velocity information for the user device, weather information, and traffic information. For instance, the system 900 may expand the area covered by the one or more zones based on determining that a user is driving instead of walking, since the former mode of transportation allows the user to cover longer distances in the same duration. In some circumstances, the system 900 may identify a larger number of events/offers to display to the user, i.e., when the user is in a faster mode of transport, as the geolocation information and associated timestamp may pass/satisfy the time and location rules for a greater number of events/offers.

As described above in relation to at least FIG. 4, passing the time rules may be based at least in part on determining that the timestamp information corresponding to the geolocation information (e.g., current location or position of user) is before one of: a cut-off time (maybe a final cut-off time for the event or offer, maybe a cut-off time for one of the zones surrounding the event or offer location), an event start time, an event expiration or end time, or any other applicable time specified by the entity. Additionally, passing the location rules may be based at least in part on determining that the geolocation information for the user (or UE) is within a zone or geofenced area (e.g., a pre-defined and static zone surrounding the event/offer location, a dynamically varying zone, a geographic area surrounding a landmark, etc.).

Offer identifying module 912 (also referred to as event identifying module 912, in some embodiments) may be configured to identify, from the plurality of offers (or events), at least one offer (or event). The identification of at least one offer may be based at least in part on the geolocation information and the information related to each of the plurality of offers.

Information obtaining module 914 may be configured to obtain, from the information related to a plurality of offers, one or more first information. Each of the one or more first information may include information related to one of the at least one offer. In some embodiments, the timestamp and the geolocation information may pass the time rules and location rules for the one of the at least one offers associated with the one or more first information displayed on the user device.

Information display module 916 may be configured to display, on the user device, the one or more first information. The one or more first information may further include information provided by at least one entity of the plurality of entities. The information for each of the plurality of offers may further include a location and geofencing information for at least one of the plurality of offers.

Offer selection module 918 may be configured to select, from the user device, a first offer of the at least one offer. By way of non-limiting example, the selecting may include sending a request for at least one of viewing, booking, and purchasing the first offer.

In some examples, the location rules for each of the plurality of offers may be defined in relation to the location and the geofencing information for at least one of the plurality of offers, as described above in relation to FIGS. 1-6.

In some examples, the time rules for each of the plurality of offers may include a first time rule for a first zone (e.g., first zone 201-*a* in FIG. 2). In some examples, the first time rule may include one of a first time range and a first cut-off time. The time rules for each of the plurality of offers may further include a second time rule for a second zone (e.g., second zone 201-*b* in FIG. 2). The second time rule may include one of a second time range and a second cut-off time. In some examples, the first zone (e.g., zone 201-*a* in FIG. 2) may be larger than the second zone (e.g., zone 201-*b* in FIG. 2). Additionally, or alternatively, the second zone (e.g., zone 201-*b*) may be surrounded by the first zone (e.g., zone 201-*a*).

In some embodiments, the first time range may start and end before the second time range (e.g., the first time range may be from 11:00 am to 1:00 pm, and the second time range may be from 1:01 pm to 2:00 pm). In some embodiments, the second cut-off time (e.g., 2:00 pm) may be later than the first cut-off time (e.g., 1:00 pm).

Acceptance receiving module 920 may be configured to receive, at the user device, an acceptance for the at least one of viewing, booking, and purchasing the first offer.

In some implementations, by way of non-limiting example, the promotional information may include one or more of media, a digital advertisement, and a notice or announcement.

In some implementations, the geofencing information may define one or more zones (e.g., zones 201-*a*, 201-*b*) surrounding the location (e.g., event location 203 in FIG. 2).

In some implementations, a geofenced area corresponding to a first buy zone (e.g., buy zone 401-*b* in FIG. 4) may be smaller than a geofenced area corresponding to a first view zone (e.g., view zone 401-*a* in FIG. 4).

In some implementations, computing platform(s) 902, remote platform(s) 904, and/or external resources 922 may be operatively linked via one or more electronic communication links. For example, such electronic communication links may be established, at least in part, via a network 950 such as the Internet and/or other networks. It will be appreciated that this is not intended to be limiting, and that the scope of this disclosure includes implementations in which computing platform(s) 902, remote platform(s) 904, and/or external resources 922 may be operatively linked via some other communication media.

A given remote platform 904 may include one or more processors configured to execute computer program modules. The computer program modules may be configured to enable an expert or user associated with the given remote platform 904 to interface with system 900 and/or external resources 922, and/or provide other functionality attributed herein to remote platform(s) 904. By way of non-limiting example, a given remote platform 904 and/or a given computing platform 902 may include one or more of a server, a desktop computer, a laptop computer, a handheld computer, a tablet computing platform, a NetBook, a Smartphone, a gaming console, and/or other computing platforms. In some cases, the terms "remote platform", "user equipment", "user device", and "UE" may be used interchangeably throughout the disclosure.

External resources 922 may include sources of information outside of system 900, external entities (e.g., a third-party social media platform, such as the one described in relation to FIG. 6) participating with system 900, and/or other resources. In some implementations, some or all of the functionality attributed herein to external resources 922 may be provided by resources included in system 900.

Computing platform(s) 902 may include electronic storage 924, one or more processors 926, and/or other components. Computing platform(s) 902 may include communication lines, or ports to enable the exchange of information with a network (e.g., network 950, network 630) and/or other computing platforms. Illustration of computing platform(s) 902 in FIG. 9 is not intended to be limiting. Computing platform(s) 902 may include a plurality of hardware, software, and/or firmware components operating together to provide the functionality attributed herein to computing platform(s) 902. For example, computing platform(s) 902 may be implemented by a cloud of computing platforms operating together as computing platform(s) 902.

Electronic storage 924 may comprise non-transitory storage media that electronically stores information. The electronic storage media of electronic storage 924 may include one or both of system storage that is provided integrally (i.e., substantially non-removable) with computing platform(s)

902 and/or removable storage that is removably connectable to computing platform(s) 902 via, for example, a port (e.g., a USB port, a firewire port, etc.) or a drive (e.g., a disk drive, etc.). Electronic storage 924 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 924 may include one or more virtual storage resources (e.g., cloud storage, a virtual private network, and/or other virtual storage resources). Electronic storage 924 may store software algorithms, information determined by processor(s) 926, information received from computing platform(s) 902, information received from remote platform(s) 904, and/or other information that enables computing platform(s) 902 to function as described herein.

Processor(s) 926 may be configured to provide information processing capabilities in computing platform(s) 902. As such, processor(s) 926 may include one or more of a digital processor, an analog processor, a digital circuit designed to process information, an analog circuit designed to process information, a state machine, and/or other mechanisms for electronically processing information. Although processor(s) 926 is shown in FIG. 9 as a single entity, this is for illustrative purposes only. In some implementations, processor(s) 926 may include a plurality of processing units. These processing units may be physically located within the same device, or processor(s) 926 may represent processing functionality of a plurality of devices operating in coordination. Processor(s) 926 may be configured to execute modules 908, 910, 912, 914, 916, 918, and/or 920, and/or other modules. Processor(s) 926 may be configured to execute modules 908, 910, 912, 914, 916, 918, and/or 920, and/or other modules by software; hardware; firmware; some combination of software, hardware, and/or firmware; and/or other mechanisms for configuring processing capabilities on processor(s) 926. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 908, 910, 912, 914, 916, 918, and/or 920 are illustrated in FIG. 9 as being implemented within a single processing unit, in implementations in which processor(s) 926 includes multiple processing units, one or more of modules 908, 910, 912, 914, 916, 918, and/or 920 may be implemented remotely from the other modules. The description of the functionality provided by the different modules 908, 910, 912, 914, 916, 918, and/or 920 described below is for illustrative purposes, and is not intended to be limiting, as any of modules 908, 910, 912, 914, 916, 918, and/or 920 may provide more or less functionality than is described. For example, one or more of modules 908, 910, 912, 914, 916, 918, and/or 920 may be eliminated, and some or all of its functionality may be provided by other ones of modules 908, 910, 912, 914, 916, 918, and/or 920. As another example, processor(s) 926 may be configured to execute one or more additional modules that may perform some or all of the functionality attributed below to one of modules 908, 910, 912, 914, 916, 918, and/or 920.

Figure 10:
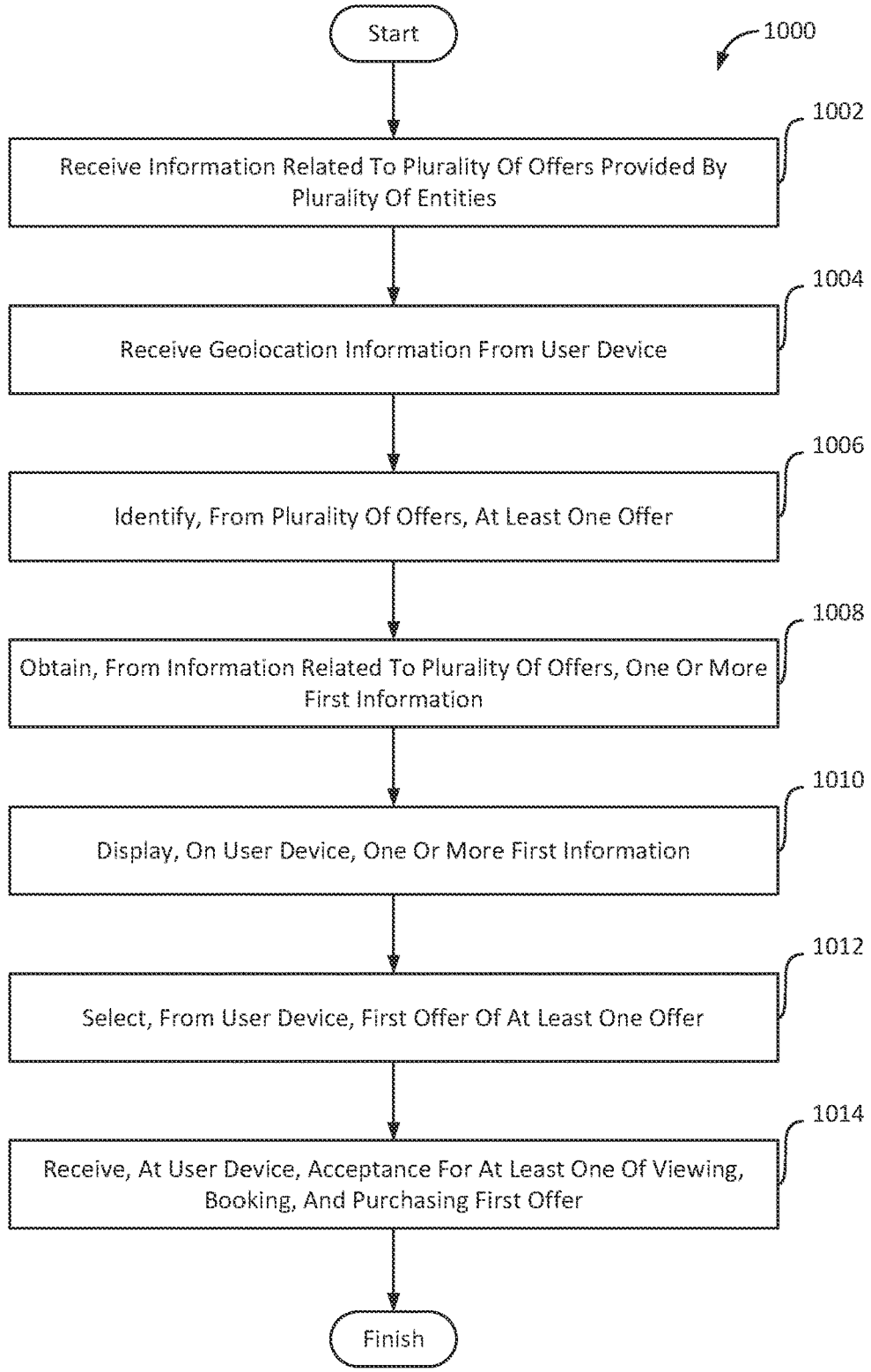
FIG. 10 illustrates a method for engaging customers using a computer platform, in accordance with various aspects of the disclosure.

FIG. 10 illustrates a method 1000 for engaging customers using a computer platform, in accordance with various aspects of the disclosure. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 and described below is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

A first operation 1002 may include receiving information related to a plurality of offers (or events) provided by a plurality of entities (e.g., business owners, event managers). The information for each of the plurality of offers may include one or more of location rules, time rules, and offer details. The first operation 1002 may be performed by one or more hardware processors configured by machine-readable instructions including a module that is the same as or similar to information receiving module 908, in accordance with one or more implementations.

A second operation 1004 may include receiving geolocation information from a user device (e.g., UE 110 in FIG. 1, where the UE 110 is associated with a user 105). In some examples, the second operation 1004 may be performed by one or more hardware processors configured by machine-readable instructions including a module that is the same as or similar to geolocation information receiving module 910, in accordance with one or more implementations.

A third operation 1006 may include identifying, from the plurality of offers, at least one offer. The identifying may be based at least in part on the geolocation information and the information related to each of the plurality of offers. The third operation 1006 may be performed by one or more hardware processors configured by machine-readable instructions including a module that is the same as or similar to offer identifying module 912, in accordance with one or more implementations.

A fourth operation 1008 may include obtaining, from the information related to the plurality of offers, one or more first information. Each of the one or more first information may include information related to one of the at least one offer. Fourth operation 1008 may be performed by one or more hardware processors configured by machine-readable instructions including a module that is the same as or similar to information obtaining module 914, in accordance with one or more implementations.

A fifth operation 1010 may include displaying, on the user device, the one or more first information. The one or more first information may further include information provided by at least one entity of the plurality of entities. Fifth operation 1010 may be performed by one or more hardware processors configured by machine-readable instructions including a module that is the same as or similar to information display module 916, in accordance with one or more implementations.

A sixth operation 1012 may include selecting, from the user device, a first offer of the at least one offer. Selecting the first offer may include sending a request for at least one of viewing, booking, and purchasing the first offer. The sixth operation 1012 may be performed by one or more hardware processors configured by machine-readable instructions including a module that is the same as or similar to offer selection module 918, in accordance with one or more implementations.

A seventh operation 1014 may include receiving, at the user device, an acceptance for the at least one of viewing, booking, and purchasing the first offer. The seventh operation 1014 may be performed by one or more hardware processors configured by machine-readable instructions including a module that is the same as or similar to acceptance receiving module 920, in accordance with one or more implementations.

Figure 8:
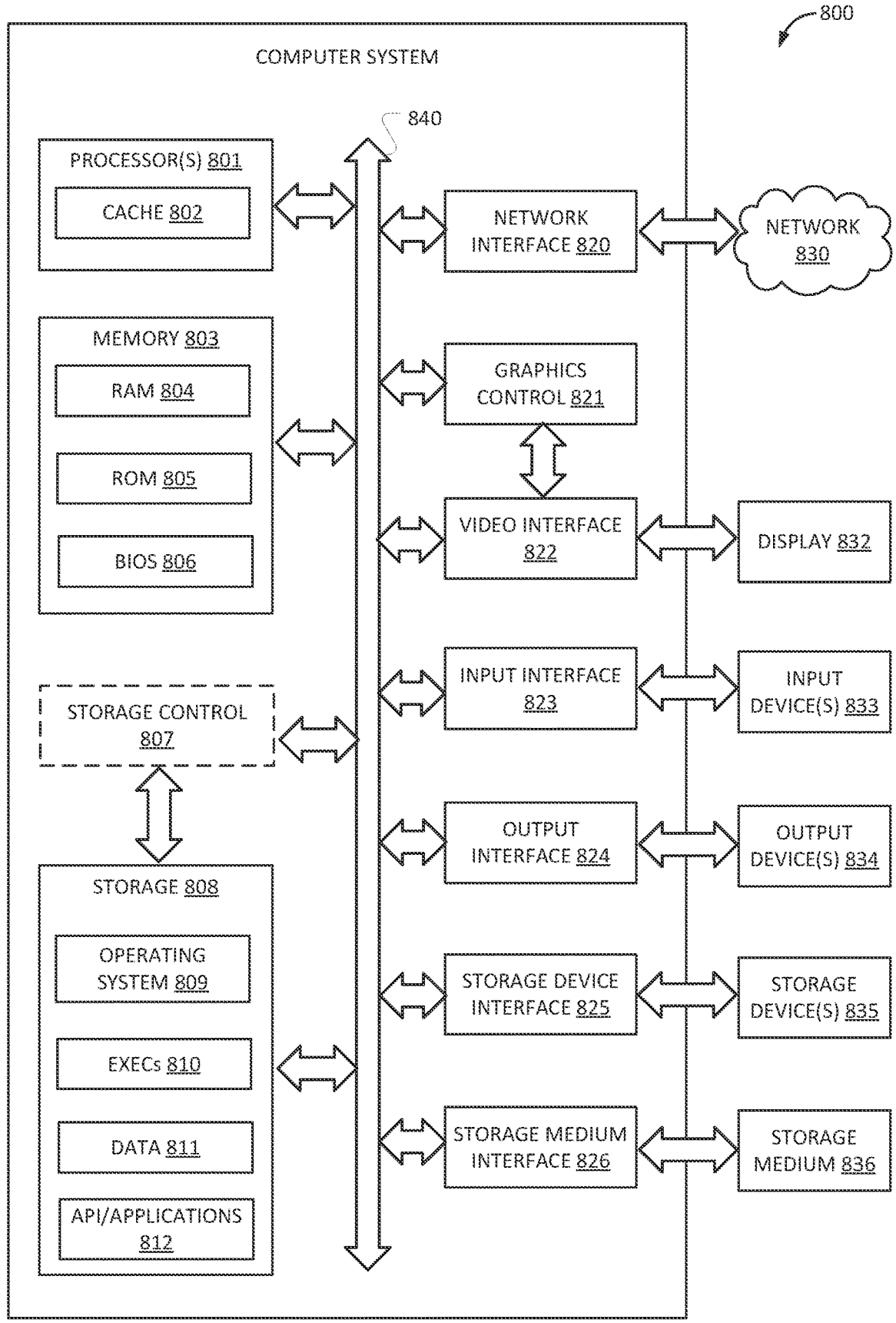
FIG. 8 illustrates a diagrammatic representation of a computer system configured for engaging customers using a computer platform, in accordance with various aspects of the disclosure.

Referring next to FIG. 8, it is a block diagram depicting an exemplary machine that includes a computer system 800 within which a set of instructions can execute for causing a device to perform or execute any one or more of the aspects and/or methodologies of the present disclosure. The components in FIG. 8 are examples only and do not limit the scope of use or functionality of any hardware, software, embedded logic component, or a combination of two or more such components implementing particular embodiments. The computer system 800 may implement one or more aspects of the UEs (e.g., UE 110, UE 210, etc.), system 600, including at least the server 605, and/or computer system 700, described in relation to FIGS. 1-7. Additionally, or alternatively, the computer system 800 may implement one or more aspects of the system 900 described in relation to FIG. 9.

Computer system 800 may include a processor 801, a memory 803, and a storage 808 that communicate with each other, and with other components, via a bus 840. The bus 840, which may be similar or substantially similar to any of buses 640 and/or 725, may also link a display 832, one or more input devices 833 (which may, for example, include a keypad, a keyboard, a mouse, a stylus, etc.), one or more output devices 834, one or more storage devices 835, and various tangible storage media 836. All of these elements may interface directly or via one or more interfaces or adaptors to the bus 840. For instance, the various tangible storage media 836 can interface with the bus 840 via storage medium interface 826. Computer system 800 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 801 (or central processing unit(s) (CPU(s))) optionally contains a cache memory unit 802 for temporary local storage of instructions, data, or computer addresses. Processor(s) 801 are configured to assist in execution of computer readable instructions. Computer system 800 may provide functionality for the components depicted in any of FIGS. 6, 7, and/or 9 as a result of the processor(s) 801 executing non-transitory, processor-executable instructions embodied in one or more tangible computer-readable storage media, such as memory 803, storage 808, storage devices 835, and/or storage medium 836. The computer-readable media may store software that implements particular embodiments, and processor(s) 801 may execute the software. Memory 803 may read the software from one or more other computer-readable media (such as mass storage device(s) 835, 836) or from one or more other sources through a suitable interface, such as network interface 820. The software may cause processor(s) 801 to carry out one or more processes or one or more steps of one or more processes described or illustrated herein. Carrying out such processes or steps may include defining data structures stored in memory 803 and modifying the data structures as directed by the software.

The memory 803 may include various components (e.g., machine readable media) including, but not limited to, a random-access memory component (e.g., RAM 804) (e.g., a static RAM "SRAM", a dynamic RAM "DRAM, etc.), a read-only component (e.g., ROM 805), and any combinations thereof. ROM 805 may act to communicate data and instructions unidirectionally to processor(s) 801, and RAM 804 may act to communicate data and instructions bidirectionally with processor(s) 801. ROM 805 and RAM 804 may include any suitable tangible computer-readable media described below. In one example, a basic input/output system 806 (BIOS), including basic routines that help to transfer information between elements within computer system 800, such as during start-up, may be stored in the memory 803.

Fixed storage 808 is connected bidirectionally to processor(s) 801, optionally through storage control unit 807. Fixed storage 808 provides additional data storage capacity and may also include any suitable tangible computer-readable media described herein. Storage 808 may be used to store operating system 809, EXECs 810 (executables), data 811, API applications 812 (application programs), and the like. Often, although not always, storage 808 is a secondary storage medium (such as a hard disk) that is slower than primary storage (e.g., memory 803). Storage 808 can also include an optical disk drive, a solid-state memory device (e.g., flash-based systems), or a combination of any of the above. Information in storage 808 may, in appropriate cases, be incorporated as virtual memory in memory 803. In some examples, the API 812 may be similar or substantially similar to the API 612 previously described in relation to FIG. 6. In some examples, events or offers may be marketed by third-party applications (e.g., maps, directories, local apps, search engines or apps, AI chat bots, etc.) via the API 612 and/or API 812. Additionally, or alternatively, the computer system 800 and/or the API 812 may be used to interface with a local business point of sale (POS), an appointment management system, a customer relationship management platform (e.g., SALESFORCE), or any other applicable third-party system/platform/application to access information related to a plurality of offers, where the information may comprise offer details (e.g., pricing information, product/event/offer description, inventory or number of spots remaining, etc.).

In one example, storage device(s) 835 may be removably interfaced with computer system 800 (e.g., via an external port connector (not shown)) via a storage device interface 825. Particularly, storage device(s) 835 and an associated machine-readable medium may provide nonvolatile and/or volatile storage of machine-readable instructions, data structures, program modules, and/or other data for the computer system 800. In one example, software may reside, completely or partially, within a machine-readable medium on storage device(s) 835. In another example, software may reside, completely or partially, within processor(s) 801.

Bus 840 connects a wide variety of subsystems. Herein, reference to a bus may encompass one or more digital signal lines serving a common function, where appropriate. Bus 840 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 800 may also include an input device 833. In one example, a user of computer system 800 may enter commands and/or other information into computer system 800 via input device(s) 833. Examples of an input device(s) 833 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 833 may be interfaced to bus 840 via any of a variety of input interfaces 823 (e.g., input interface 823) including, but not limited to, serial, parallel, game port, USB, FIREWIRE, THUNDERBOLT, or any combination of the above.

In particular embodiments, when computer system 800 is connected to network 830, computer system 800 may communicate with other devices, specifically mobile devices (e.g., UEs) and enterprise systems, connected to network 830. Communications to and from computer system 800 may be sent through network interface 820. For example, network interface 820 may receive incoming communications (such as requests or responses from other devices) in the form of one or more packets (such as Internet Protocol (IP) packets) from network 830, and computer system 800 may store the incoming communications in memory 803 for processing. Computer system 800 may similarly store outgoing communications (such as requests or responses to other devices) in the form of one or more packets in memory 803 and communicated to network 830 from network interface 820. Processor(s) 801 may access these communication packets stored in memory 803 for processing.

Examples of the network interface 820 include, but are not limited to, a network interface card, a modem, and any combination thereof. Examples of a network 830 or network segment 830 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 830, may employ a wired and/or a wireless mode of communication. In general, any network topology may be used.

Information and data can be displayed through a display 832. Examples of a display 832 include, but are not limited to, a liquid crystal display (LCD), an organic liquid crystal display (OLED), a cathode ray tube (CRT), a plasma display, and any combinations thereof. The display 832 can interface to the processor(s) 801, memory 803, and fixed storage 808, as well as other devices, such as input device(s) 833, via the bus 840. The display 832 is linked to the bus 840 via a video interface 822, and transport of data between the display 832 and the bus 840 can be controlled via the graphics control 821.

In addition to a display 832, computer system 800 may include one or more other peripheral output devices 834 including, but not limited to, an audio speaker, a printer, and any combinations thereof. Such peripheral output devices may be connected to the bus 840 via an output interface 824. Examples of an output interface 824 include, but are not limited to, a serial port, a parallel connection, a USB port, a FIREWIRE port, a THUNDERBOLT port, and any combinations thereof.

In addition, or as an alternative, computer system 800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Additional Embodiments

Some example scenarios contemplated by aspects of the present disclosure include: providing a person or group of people unfamiliar with an area (e.g., a city) with a last-minute recommendation for finding restaurants around them that have open tables, happy hour, or any other offer; helping a person who wants a haircut today to find offers at barbers/salons nearby that have an open appointment that is expiring soon; helping a person or a group of people to find concert tickets that have been discounted by the event organizer to drive sales of remaining/unsold tickets last-minute before the concert starts; helping two friends to get some exercise by directing them to a booking page for a yoga class that starts nearby in one hour.

Some other example scenarios contemplated by aspects of the present disclosure include: helping a massage therapist to find a customer for booking a 2 pm appointment available today, which would expire unless the massage therapist is able to fill the spot last-minute; helping a car wash to get more customers during their off-peak hours (e.g., 9:00 am-10:00 am on a weekday); helping a local bagel shop that closes in an hour to sell any remaining bagels that were baked that day before the end of the day; helping a brewery to find customers during their off-peak hours (e.g., between 3 and 5 pm); helping a college to sell available college football tickets an hour or two before the start of the game; helping a golf course to fill a last-minute tee time before time expires; helping a yoga studio that has 10 spots open for a 4 pm class to get customers to sign up and try their yoga class at a discounted price; helping a dance hall hosting a live music and dancing event to get another 50 customers interested in dancing to sign up last-minute.

It should be noted that the example scenarios described above are merely examples and are not intended to be limiting. The system/platform of the present disclosure may be utilized in other ways, not listed herein, by event managers/business owners and customers, alike. As used herein, the term "event" may refer to any time-based offering (e.g., local offering), such as but not limited to: food and drink, local services, activities, concerts, sporting events, fitness classes, etc. Broadly, anything local that can be "scheduled" can be posted as an event on the application/marketplace by a business owner/event organizer, in some examples.

As described above, customers/users can view their current location (e.g., customer location 202 in FIG. 2) and the location of the event (e.g., event location 203) in a dynamic map view (e.g., map 299 displayed on UE 210). Customers can see how much time is remaining to buy the offer(s) for the event. Further, customers can also see how long until the buy zone will reduce (e.g., in area) and the perimeter of the smaller new zone. In some cases, customers in the view zone, but not in the buy zone, may be able to view the event through the app (e.g., accessed from a UE, such as a smartphone) but may not be able to purchase the offer(s), such as tickets, for the event. Customers outside the view zone may not be able to view the event (i.e., on the marketplace or application accessed from a UE, such as a smartphone), in some examples. In some cases, the view zone and buy zone may be set up as the same zone or different zones, as described above in relation to at least FIG. 4. In one non-limiting example, the view zone may comprise a geofenced area having a larger area than a geofenced area of the buy zone. In some cases, users/customers are mobile (i.e., their location is not fixed) and the one or more zones associated with the event/offer may also dynamically change as a function of time, as a function of user velocity, weather conditions, and/or traffic conditions, to name a few. In such cases, the system may periodically refresh its stored information to update eligibility across a plurality of users and a plurality of events. In some examples, the eligibility (e.g., evaluating whether a given user or customer is eligible to purchase an offer, such as a ticket, for an event) may be determined based on assessing one or more of a current time and current geolocation information for the user with respect to one or more of the location rules and time rules for an event/offer, previously discussed in relation to at least FIGS. 1-4.

Some example scenarios directed to view/buy zones may include helping a massage therapist that has a 2 pm appointment available only market the appointment to potential customers that can make it to the appointment on time, as it is already 1 pm. In this example, at 1 pm, the current view zone may be set to 30 miles and the current buy zone to 10 miles. A customer who is 25 miles away may be able to view the massage appointment event but not purchase it unless he/she drives closer. Further, another customer 8 miles away from the massage appointment event may be able to not only view, but also purchase the offer for the event. In some cases, the view zone and/or buy zone may shrink (or reduce in size) closer to the appointment time. For instance, at 1:30 pm, the view zone may be reduced to 10 miles and the buy zone to 3 miles. In some examples, the ability to view and/or buy the appointment event may expire by (or at) the appointment time. In some cases, the appointment event may not be visible to a customer who is outside the view zone (e.g., 30 miles, 10 miles) for that appointment event.

Aspects of the present disclosure also support social engagement. It is contemplated that user access or ability to perform one or more of the social interactions described herein may depend on their current, past, or future proximity to a zone (or geofenced area). Once such social interaction may comprise allowing users to share their status related to an event with others (e.g., Friends, Public, Private-Only). Some non-limiting examples of statuses that a customer can assign to an event include: unchecked (user has not taken any action, such as purchasing an offer or ticket, for this event), interested (user/customer has indicated an interested in attending the event), going (customer has purchased an offer or ticket to the event), checked in/went (customer attended the event, in which case the status for the order changed), went+rating (customer attended the event and subsequently left a rating, score, or testimonial pertaining to their event experience).

In some cases, based on the customer's privacy setting, users of a third-party social media platform may or may not be able to access a user's status as it pertains to an event. For instance, in some cases, one or more other users that are linked/connected with the user may be able to view the user's status as it pertains to the event. In other cases, any user of the third-party social media platform may be able to view the user's status for an event, irrespective of whether they are linked/connected to the user, e.g., on the user's friend list. In some cases, the application/marketplace of the present disclosure may link to one or more third-party social media platforms (e.g., FACEBOOK or META, SNAPCHAT, INSTAGRAM, TIKTOK, etc.), which allows the application to access the user's friends list, contact list, etc. This in turn can help drive sales, facilitate engagement between local businesses and potential new customers, enhance quality of products or events offered to customers (i.e., as a result of gathering additional data from customer feedback, ratings or scores submitted by new customers, etc.), to name a few. In other cases, the customer/user may select to have their status for an event as "Private", in which case only the customer and/or the local business related to the event may be able to see the customer's status (e.g., unchecked, interested, going, checked in/went, went+rating, etc.).

Additional social interactions may comprise viewing a subset of or all marketing and promotional content related to an event; purchasing tickets for an event or leaving a comment or post about an event; and/or submitting a bid for an event/offer, for instance, if a local business or entity is providing the event or offer in an auction format. Social interactions may also include viewing and participating in social interactions related to an event or identifying an interest level associated with an event. The commerce platform/system, such as system 600 or system 900, may also provide surveys or forms for social interactions related to an event or allow users to review or rate an event. As used herein, the term "surveys" or "forms" refers to digital surveys or forms that are administered through a computing platform (e.g., transmitted via email, presented on a website or mobile app, etc.). In some cases, social media interactions as they relate to the commerce platform/system may comprise providing users/customers with a list of contacts (e.g., friends, friends of friends) that are interested in or going to an event, providing updates when a contact has updated their social media status related to an event, and/or receiving notifications related to the event. Social interactions may also include providing users/customers with the ability to view a list of contacts (e.g., friends, social media contacts or connections) within their zone (or even an adjacent zone) and send a ping/message, where the ping or message comprises an invitation to attend an event, an invitation to purchase an offer or event as a group to receive group pricing rates (if applicable), a request to act as a referral to receive a friends/family discount, etc.

In some instances, social engagement and participation within the commerce platform, between platform user connections (e.g., "friends") and/or with other users, event holders, etc., that a user is not "connected" with on the commerce platform, may be dependent on the user's current and/or previous locations, current and/or previous zones, estimated movement of the user (e.g., whether the user is moving towards or away from a zone associated with an event/offer), etc. In some instances, social engagement and participation for an event/offer within the commerce platform may be limited based on whether a user/customer is within a zone associated with said event or offer. In one non-limiting example, a user may be able to perform one or more actions, such as, but not limited to, sharing an event or offer listing, liking a post associated with an event/offer, inviting their friends or social contacts to attend an event or offer, and/or add multimedia content (e.g., photos, videos, etc.) related to an event or offer, based on whether the user is located within the zone associated with the event/offer. As noted above, the commerce platform may be configured to link to one or more third-party social media platforms (e.g., FACEBOOK, INSTAGRAM, etc.). In such cases, the one or more actions (e.g., sharing, liking, inviting, adding content, etc.) may comprise social media actions that are linked or associated with the third-party social media platform.

In some embodiments, different users may view different marketing elements (e.g., videos, photos, marketing or promotional content, etc.) for the same event/offer based on time remaining (i.e., before the event or offer expires), distance to event or offer location, and/or user attributes (e.g., age group, gender, demographic information, etc.).

In some instances, businesses or entities may be provided access to different features of the commerce platform based on a subscription level (e.g., basic, standard or regular, premium), type of business (e.g., a live music venue, a restaurant, and a retail store may share some, but not all, features of the commerce platform), size of business or entity (e.g., number of employees, number of unique visitors per day/month/week, monthly or annual revenue), etc. Some non-limiting examples of features include dynamic pricing (e.g., based on demand or market conditions) and/or dynamically varying geofenced areas or zones (e.g., based on determining user velocity or speed, mode of transport, etc.).

The systems and methods described herein include various computing devices such as, but not limited to, the computing system 705, server 605, system 900, computer system 800, and/or UEs 110, 210, 310, 410, 510, 610, and 666. In some instances, the computing devices described herein may also be referred to as a computing system or a computer system.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system configured for engaging customers using a computer platform, the system comprising:
    one or more hardware processors configured by machine-readable instructions to:
    receive, from an event manager client device, information of an event including an event time and an event location;
    determine a plurality of geofenced zones for the event location, the plurality of geofenced zones surrounding the event location and having different sizes;
    determine, for each of the plurality of geofenced zones, a time-sensitive offer for purchasing access to the event, wherein the time-sensitive offer is different for each of the plurality of geofenced zones;
    receive geolocation information from one or more user devices;
    input the geolocation information and information of the time-sensitive offer for each of the plurality of geofenced zones into one or more data structures;
    periodically refresh the one or more data structures when determining at least one geofenced zone among the plurality of geofenced zones that contains a user device in a time period at least partially before the event time;
    transmit, to the user device, the time-sensitive offer that corresponds with the at least one geofenced zone; and
    in response to receiving, from the user device, an acceptance that satisfies one or more conditions of the time-sensitive offer, initiate a transaction for the user device to purchase access to the event, wherein one or more of the plurality of geofenced zones include a buy zone and a view zone, and wherein one or more of the buy zone and the view zone automatically shrink in size as the event time approaches.

2. The system of claim 1, wherein the time-sensitive offers are different according to time windows for purchasing access to the event, the time windows defined by one or more of a start time, an end time, one or more cut-off times, and a time range.

3. The system of claim 1, wherein the time-sensitive offer further includes one or more of:
 pricing information,
 promotional information, wherein the promotional information comprises one or more of media, a digital advertisement, and a notice or announcement, and
 information related to one or more of age requirements and group size requirements.

4. The system of claim 1, wherein one or more of the buy zone and the view zone automatically expand in size based on a detected low demand for the event.

5. The system of claim 1, wherein the plurality of geofenced zones are assigned different time windows based on a distance of each geofenced zone to the event location, and the different time windows have at least different cut-off times for purchasing access to the event.

6. The system of claim 5, wherein:
 a first geofenced zone having a first distance from the event location is assigned a first time window having a first cut-off time for purchasing access to the event,
 a second geofenced zone having a second distance from the event location is assigned a second time window having a second cut-off time for purchasing access to the event,
 the first distance is larger than the second distance, and
 the first cut-off time is further in advance of the event time than the second cut-off time.

7. The system of claim 6, wherein the acceptance satisfies the one or more conditions of the time-sensitive offer if a location of the user device at a time of sending the acceptance satisfies location and time rules of the time-sensitive offer.

8. The system of claim 1, wherein the one or more hardware processors further configured by machine-readable instructions to:
 determine the time-sensitive offer for the user device based on which geofenced zone containing the user device is closest to the event location.

9. The system of claim 1, wherein the time-sensitive offer instructs the user device to move to a geofenced zone that is closer to the event location as a condition for purchasing access to the time-sensitive offer.

10. The system of claim 1, wherein pricing assigned to one or more of the plurality of geofenced zones automatically reduces as the event time approaches.

11. The system of claim 1, wherein the initiating the transaction for the user device to purchase access to the event comprises one or more of:
 reserving an available opening for a user of the user device to arrive at the event and pay at the event location; and
 prompting the user device to enter payment information via a user interface to complete the transaction.

12. The system of claim 1, wherein:
 a geofenced area corresponding to the first buy zone is smaller than a geofenced area corresponding to the view zone; or
 the geofenced area corresponding to the buy zone is larger than the geofenced area corresponding to the view zone.

13. The system of claim 1, wherein the time-sensitive offers are different by at least one condition for purchasing access to the time-sensitive event.

14. The system of claim 1, wherein one or more of the buy zone and the view zone automatically shrink in size as an end time of the event approaches.

15. A method for engaging customers using a computer platform, the method comprising:
 receiving, from an event manager client device, information of an event including an event time and an event location;
 determining a plurality of geofenced zones for the event location, the plurality of geofenced zones surrounding the event location and having different sizes;
 determining, for each of the plurality of geofenced zones, a time-sensitive offer for purchasing access to the event, wherein the time-sensitive offer is different for each of the plurality of geofenced zones;
 receiving geolocation information from one or more user devices;
 inputting the geolocation information and information of the time-sensitive offer for each of the plurality of geofenced zones into one or more data structures;
 periodically refreshing the one or more data structures to increase computing efficiency for determining at least one geofenced zone among the plurality of geofenced zones that contains a user device in a time period at least partially before the event time;
 transmitting, to the user device, the time-sensitive offer that corresponds with the at least one geofenced zone; and
 in response to receiving, from the user device, an acceptance that satisfies one or more conditions of the time-sensitive offer, initiating a transaction for the user device to purchase access to the event,
 wherein one or more of the plurality of geofenced zones include a buy zone and a view zone, and
 wherein one or more of the buy zone and the view zone automatically shrink in size as the event time approaches.

16. The method of claim 15, wherein the time-sensitive offers are different according to time windows for purchasing access to the event, the time windows defined by one or more of a start time, an end time, one or more cut-off times, and a time range.

17. The method of claim 15, wherein the plurality of geofenced zones are assigned different time windows based on a distance of each geofenced zone to the event location, and the different time windows have at least different cut-off times for purchasing access to the event.

18. The method of claim 17, wherein:
 a first geofenced zone having a first distance from the event location is assigned a first time window having a first cut-off time for purchasing access to the event,
 a second geofenced zone having a second distance from the event location is assigned a second time window having a second cut-off time for purchasing access to the event,
 the first distance is larger than the second distance, and
 the first cut-off time is further in advance of the event time than the second cut-off time.

19. The method of claim 15, wherein the time-sensitive offer instructs the user device to move to a geofenced zone that is closer to the event location as a condition for purchasing access to the time-sensitive offer.

20. The method of claim 19, wherein pricing assigned to one or more of the plurality of geofenced zones automatically reduces as the event time approaches.

21. A non-transient computer-readable storage medium having instructions embodied thereon, the instructions being executable by one or more processors to perform a method for engaging customers using a computer platform, the method comprising:

receiving, from an event manager client device, information of an event including an event time and an event location;

determining a plurality of geofenced zones for the event location, the plurality of geofenced zones surrounding the event location and having different sizes;

determining, for each of the plurality of geofenced zones, a time-sensitive offer for purchasing access to the event, wherein the time-sensitive offer is different for each of the plurality of geofenced zones;

receiving geolocation information from one or more user devices;

inputting the geolocation information and information of the time-sensitive offer for each of the plurality of geofenced zones into one or more data structures;

periodically refreshing the one or more data structures to increase computing efficiency for determining at least one geofenced zone among the plurality of geofenced zones that contains a user device in a time period at least partially before the event time;

transmitting, to the user device, the time-sensitive offer that corresponds with the at least one geofenced zone; and in response to receiving, from the user device, an acceptance that satisfies one or more conditions of the time-sensitive offer, initiating a transaction for the user device to purchase access to the event, wherein one or more of the plurality of geofenced zones include a buy zone and a view zone, and wherein one or more of the buy zone and the view zone automatically shrink in size as the event time approaches.

* * * * *